US009767265B2

(12) United States Patent
Schropfer et al.

(10) Patent No.: US 9,767,265 B2
(45) Date of Patent: Sep. 19, 2017

(54) AUTHENTICATION WITH PARENTAL CONTROL FUNCTIONALITY

(71) Applicant: Anchor ID, Inc., Kingston, NY (US)

(72) Inventors: David Waldron Schropfer, Woodstock, NY (US); David Koplovitz, Coral Springs, FL (US)

(73) Assignee: ANCHOR ID, INC., Kingston, NY (US)

( * ) Notice: Subject to any disclaimer, the term of this patent is extended or adjusted under 35 U.S.C. 154(b) by 258 days.

(21) Appl. No.: 14/705,554

(22) Filed: May 6, 2015

(65) Prior Publication Data

US 2015/0326550 A1    Nov. 12, 2015

Related U.S. Application Data

(60) Provisional application No. 61/989,410, filed on May 6, 2014, provisional application No. 61/989,413, filed on May 6, 2014.

(51) Int. Cl.

| G06F 3/00 | (2006.01) |
|---|---|
| G06F 21/31 | (2013.01) |
| H04L 29/06 | (2006.01) |
| G06F 21/32 | (2013.01) |
| H04L 29/08 | (2006.01) |
| G06F 17/30 | (2006.01) |

(52) U.S. Cl.
CPC ........ *G06F 21/31* (2013.01); *G06F 17/30867* (2013.01); *G06F 21/32* (2013.01); *H04L 63/08* (2013.01); *H04L 63/083* (2013.01); *H04L 63/0861* (2013.01); *H04L 63/10* (2013.01); *H04L 63/168* (2013.01); *H04L 67/14* (2013.01); *G06F 2221/2101* (2013.01); *G06F 2221/2149* (2013.01)

(58) Field of Classification Search
CPC .... G06F 17/30867; G06F 21/31; G06F 21/32; G06F 2221/2101; G06F 2221/2149; H04L 63/08; H04L 63/083; H04L 63/0861; H04L 63/10; H04L 63/168; H04L 67/14
USPC .......................................................... 726/7
See application file for complete search history.

(56) References Cited

U.S. PATENT DOCUMENTS

| 4,558,302 A * | 12/1985 | Welch ..................... G06T 9/005 341/51 |
|---|---|---|
| 5,717,426 A * | 2/1998 | Ohkado ................ G06F 3/0489 345/157 |
| 2009/0218392 A1 * | 9/2009 | Biskupski .......... B65D 73/0014 235/375 |

(Continued)

*Primary Examiner* — Joseph P Hirl
*Assistant Examiner* — Sayed Beheshti Shirazi
(74) *Attorney, Agent, or Firm* — Epstein Drangel LLP; Robert L. Epstein

(57) ABSTRACT

In various embodiments, disclosed are a system and method for authenticating activity associated with a child account as controlled or managed by a parent account. A child-account user can enter a username, or other form of access information, in a child-account device. The username can contain a predetermined identifier in response to which, upon detecting the presence of the predetermined identifier, a third-party website can carry out authentication functions including sending a message to an authentication platform that carries out additional authentication functions, provided that a parent-account device authorizes doing so.

16 Claims, 40 Drawing Sheets

(56) References Cited

U.S. PATENT DOCUMENTS

| | | | | |
|---|---|---|---|---|
| 2011/0045851 A1* | 2/2011 | Maddox | ................... | H04W 4/06 |
| | | | | 455/466 |
| 2011/0126266 A1* | 5/2011 | Weatherston | ........... | G06F 21/31 |
| | | | | 726/4 |
| 2013/0055362 A1* | 2/2013 | Rathbun | ................. | H04L 63/18 |
| | | | | 726/5 |
| 2013/0219517 A1* | 8/2013 | Yerli | ....................... | G06F 21/31 |
| | | | | 726/28 |
| 2014/0292499 A1* | 10/2014 | Zhang | ............... | G06K 7/10009 |
| | | | | 340/10.52 |
| 2015/0220998 A1* | 8/2015 | Futa | ................... | G06Q 30/0241 |
| | | | | 705/14.66 |
| 2015/0358263 A1* | 12/2015 | Bertin | ...................... | G06F 9/54 |
| | | | | 709/206 |

\* cited by examiner

FIG. 7A

Please submit your details below to try your free demo account.

Your details

| | |
|---|---|
| First name* | JOHN |
| Last name* | DOE |
| Company name* | AUTHENTICATIONSITE |
| Company Tel. No | 212-123-4567 |
| Job status | Please Select ▶ |
| 720 ⟶ Email address* | JD@AUTHENTICATIONSITE.COM |
| Address 1* | 123 MAIN ST |
| Address 2* | SUITE #103 |
| County | Please Select ▶▶ |
| Country | Please Select |
| Postcode* | 12345 |

FIG. 7B

Please submit your details below to try your free demo account.

Your details

| | |
|---|---|
| First name* | 7HGFT%4R |
| Last name* | 5FGG4F5 |
| Company name* | HHJNBFF6F |
| Company Tel. No | 212-123-4567 |
| Job status | Please Select ▶ |
| 710 ⟶ Email address* | >X@AUTHENTICATIONSITE.COM |
| Address 1* | 123 MAIN ST |
| Address 2* | |
| County | Please Select ▶▶ |
| Country | Please Select |
| Postcode* | 12345 |

| | | |
|---|---|---|
| 1210 | First Name | 7HGFT4R |
| 1212 | Last Name | 5FGG4FS |
| 1214 | Telephone | 212-111-1111 |
| 1216 | Marital Status | Yes |
| 1218 | Email Address | X@authenticationsite.com |
| 1220 | Address 1 | 4LAX4R |
| 1222 | State | NY |
| 1224 | Country | USA |
| 1226 | Zip | 12345 |
| 1228 | Backup User Name | H5GFY98GW |
| 1230 | Backup Password | BV9N5G3DF |

FIG. 12

AUTHENTICATION WITH PARENTAL CONTROL FUNCTIONALITY

BACKGROUND

In our highly connected world, establishing secure access for a user seeking to log in to a website can mean the difference between safe, effective online relationships and a Pandora's box of problems including risks to an individual's privacy, bank account, or even personal safety. Where a password is used to facilitate access controls, security can be jeopardized if the password falls into the wrong hands, or the sheer amount of passwords causes management issues. While many adults have encountered one or more security issues, younger computer users present unique problems when it comes to online activities in light of their lesser experience and added vulnerability.

Measures have been taken to protect children's online activities. These include federal statutes such as the Children's Online Privacy Protection Act (COPPA), and implementing regulations thereof by the Federal Trade Commission. However, these rules generally apply to children under 13 only, and may not be able to prevent website owners from interacting with children, intentionally or not.

On the one hand, children may not be resourceful enough to avoid undesirable online activities. On the other, children may be so clever as adeptly to avoid the watchful eye of a parent or guardian who may not be in a position to supervise all online activities.

It would be desirable to establish an environment where an adult can meaningfully supervise a child's online activities, including effectively establishing access controls with a website in the first instance so as to ensure safe, approved online relationships.

Also, certain employees and other users of computer systems need approval from supervisors to perform sensitive functions within a computer system. It would be desirable to establish an environment where a supervisor can meaningfully and quickly approve a request of a subordinate.

FIGURES

The features of the various embodiments are set forth with particularity in the appended claims. The various embodiments, however, both as to organization and methods of operation, together with advantages thereof, may best be understood by reference to the following description, taken in conjunction with the accompanying drawings as follows:

FIGS. 7A and 7B illustrate embodiments of example account detail information.

FIG. 12 illustrates one embodiment of a screen display illustrating information shared by a user.

DESCRIPTION

In various embodiments, a computer-implemented system and method for authentication with parental control functionality is disclosed.

In example embodiments, parental control can refer to the supervision and/or management by a parent or guardian over his or her children's online activities, or by a manager over her employees. It can also refer to supervision or control by an individual with a higher trust level over an individual with a lower trust level, where trust level is a parameter indicating the extent to which a user is trusted to perform an online activity. By way of non-limiting example, once the parent's trust level is established, such as by authentication of the parent's identity by an online mechanism, a parent can be considered to have a higher trust level than that of a child. However, it will be apparent that a comparable relationship can be evident with an adult who may wish to assist in supervising and/or controlling the online activities of an aging parent who is not as technically proficient, a teacher who is managing the computer use of a student, and many other instances. Herein "parent account" can be used to refer to the account of an actual parent of a child, but also the account of an individual or organization whose trust level is senior to that of a junior individual or organization. And, "child account" can be used to refer to the account of an actual child of a parent, but also the account of an individual or organization whose trust level is junior to that of a senior individual or organization. Further, as used herein, the device associated with a parent account can be referred to as a parent-account device, and a device associated with a child account can be referred to as a child-account device. Also as used herein, the user of a device with which a child account is associated can be referred to as a child-account user, and a user associated with a parent account can be referred to as a parent-account user. In addition, as used herein child-account access credentials can refer to the credentials of the child-user.

Reference will now be made in detail to several embodiments, including embodiments showing example implementations of systems and methods for accessing computer accounts. Wherever practicable similar or like reference numbers may be used in the figures and may indicate similar or like functionality. The figures depict example embodiments of the disclosed systems and/or methods of use for purposes of illustration only. One skilled in the art will readily recognize from the following description that alternative example embodiments of the structures and methods illustrated herein may be employed without departing from the principles described herein.

Figure 1:
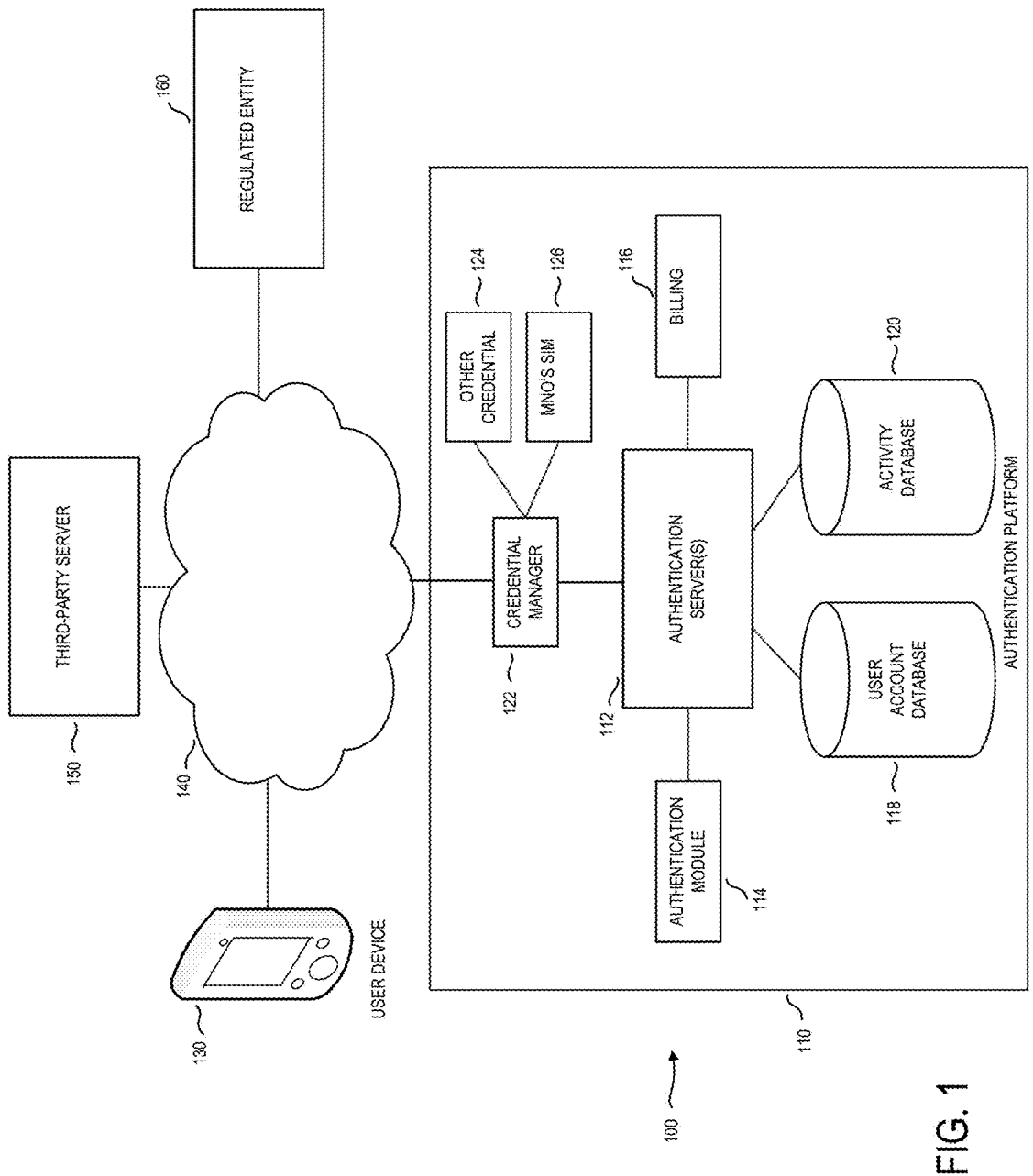
FIG. 1 illustrates one embodiment of a system for accessing computer accounts.

FIG. 1 is a simplified diagram illustrating a non-limiting system for accessing computer accounts. Multiple architectures, components and interconnections can be used to carry out embodiments herein.

System 100 disclosed in FIG. 1 includes authentication platform 110. Authentication platform 110 can include an authentication server or servers 112. An authentication module 114 can be provided that carries out authentication functionality. A billing module 116 can be provided that performs billing and other accounting functions. A user account database 118 can store information related to the account of users, which can also store user information and data collected about a user account. An activity database 120 can store information related to the activities of users. A credential manager 122 can perform functions of managing the flow of encrypted data. Credential manager 122 can be in operative communication with other credential 124 which can comprise secure element (SE) or Host Card Emulation (HCE) product or similar functionality, and a mobile network operator's SIM (subscriber identity module) 126.

A user can use a user device 130 to carry out authentication operations. User device can comprise a mobile phone, personal computer, tablet, computerized glasses, computerized watches, or any user device. User device 130 can be in operative communication with network 140 to facilitate communication to and within the components and functionalities disclosed herein. It will readily be appreciated that network 140 can comprise one or more of the Internet, a Local Area Network (LAN), or any other network that can carry communications to or from a device such as user device 130. The user can desire to authenticate on, or otherwise obtain one or more levels of access from, a third-party server 150. Third-party server 150 can comprise a popular social media website such as Twitter®, a digital commerce website such as Amazon®, or any other website or address-based location with access controls requiring user authentication. An end result of embodiments herein is to accord a secure relationship between a user device 130 (and/or its user) and a third-party server 150; additionally, gradation levels of a secure relationship can be obtained based on varying levels of trust and/or access permissions.

Regulated entity 160 can comprise a public and/or private entity that is subject to the jurisdiction of federal, state, local, administrative or other regulations and/or rules, or any other database that contains personally identifiable information (PII) including self-regulated payment card industry (PCI) systems. Accordingly, regulated entity 160 can comprise a Department of Vehicles or other entity administering a driver's license, a bank, an insurance company, a health care company, and more.

Figure 2:
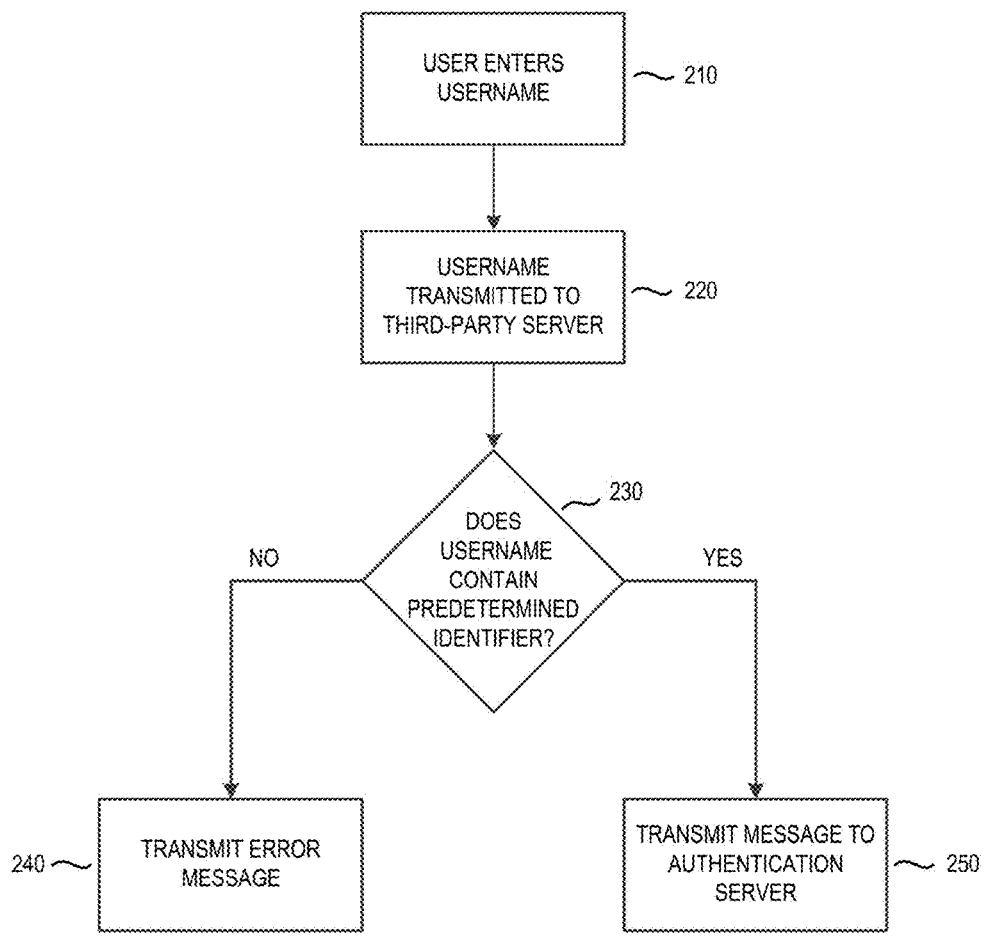
FIG. 2 illustrates one embodiment of a process for accessing computer accounts.

In embodiments, as seen in FIG. 2 a user desires to acquire electronic access to a third-party server 150. (For illustrative purposes, third-party server 150 may also be referred to as "3PWebsite" herein.) To permit such access, the user's identity can be authenticated. Under certain circumstances, authentication has been accomplished by virtue of a username and password entered by a user.

However, in accord with embodiments the user can enter a single string, such as username only. Accordingly, the user can enter a username 210 on device 130. The username can be transmitted to third-party server 220. Third-party server can carry out a determination whether the username contains a predetermined identifier 230.

Figure 3:
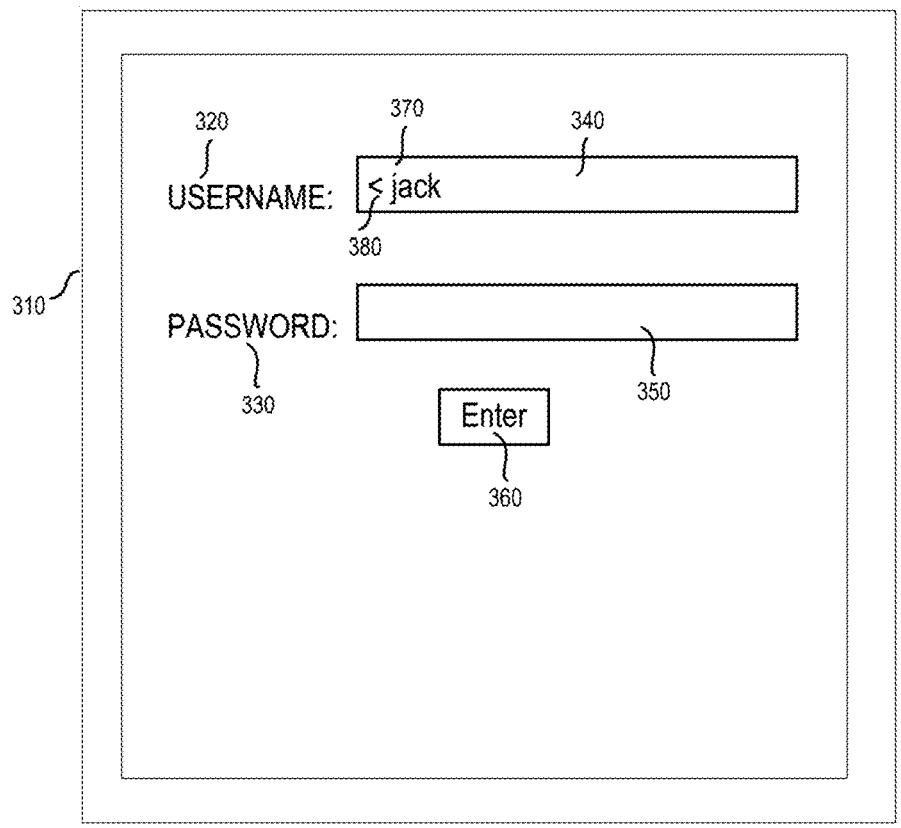
FIG. 3 illustrates an example dialog box with a username and password field.

FIG. 3 illustrates an example dialog box 310 displayed on the screen of user device 130 that can assist in authenticating the user to third-party website 150. Dialog box 310 can request a username 320, and password 330. The user can enter information in field 340 related to a username, and in field 350 related to a password 330. By way of non-limiting embodiment, the user can enter a string "<jack" 370 in username field 340. It will be evident that "<jack" 370 contains the symbol "<", which can be considered a prefix, to "jack". By way of another non-limiting embodiment, any string of letters, numbers, symbols or other allowed characters can be used as a predetermined identifier. Without entering any text in the password field 350, the user can then actuate the Enter button 360, or the like, to transmit the username "<jack" to third-party server 150.

Returning to FIG. 2, third-party server 150 can determine if the username 370 contains a predetermined identifier. A predetermined identifier can comprise any identifier readable or otherwise resolvable by a computer system, such as but not limited to those on a QWERTY keyboard, e.g., a "<" character, another character or character or group of symbols, a letter or group of letters, or a number or numbers or group of numbers. A predetermined identifier can also be derived from barcodes, QR codes, and digital watermarks. It will be appreciated that the predetermined identifier can comprise a unit of information, small or large, rendered in a manner readable or otherwise resolvable by a computer system. In addition, an added predetermined activity or state can represent the identifier. For example, a user could employ an ID only, such as where a predetermined identifier is assumed. A user could also employ a Near Field Communication (NFC) process as the predetermined activity or state in conjunction with (or not in conjunction with) a username. A user could also employ an authentication with a special authentication button dedicated to the authentication platform 110, e.g., "Send to AuthenticationSite". (For illustrative purposes, authentication platform 110 may also be referred to as "AuthenticationSite" herein.) Also, it will be appreciated that although the term "username" is being used, an additional term can be applied.

Having determined that the username (<jack) contains a predetermined identifier 230, third-party server 150 can transmit a message to an authentication server 250, such as authentication server 112. If, however, third-party server 150 does not detect a predetermined identifier in the username 230, an error message 240 can be transmitted back to the user.

It will be appreciated that, as seen in FIG. 3, no information has been entered in the password field 350 prior to transmission of the username <jack 370. This is because in embodiments merely a username can be transmitted. The password field 350 can be left blank, in distinction to certain approaches, which might return an error message of the form "Please enter your password".

Figure 4:
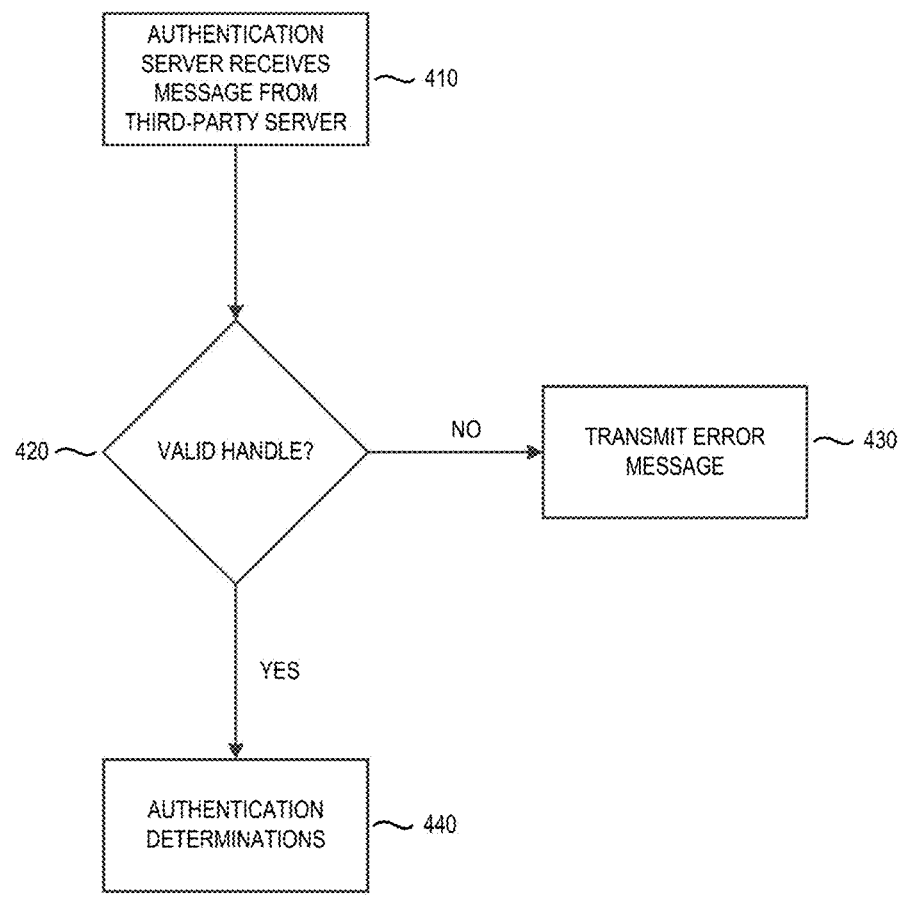
FIG. 4 illustrates one embodiment of a process for accessing computer accounts.

In FIG. 4, embodiments of activities of the authentication platform 110 are illustrated. Authentication server 112 receives a message from third-party server 150. Here the message comprises the username <jack, but no password. Authentication server is prepared to evaluate the username because an authentication relationship has been established between authentication server 112 and third-party website 150 in advance, as described in detail below. Authentication server 112 assesses whether <jack comprises a special username, i.e., a valid handle 420. A handle is a special username associated with a user, which username is recognized by authentication platform 110. This special username has been established in advance of, or concurrently with, the current authentication session.

Authentication server 112 can attempt to perform an authentication sequence for the user. It will also readily be appreciated that authentication server 112 can carry out access controls for multiple levels of access into third-party server 150, not just initial authentication. Hence embodiments disclosed herein can cover not just initial login but successive access levels.

Figure 5:
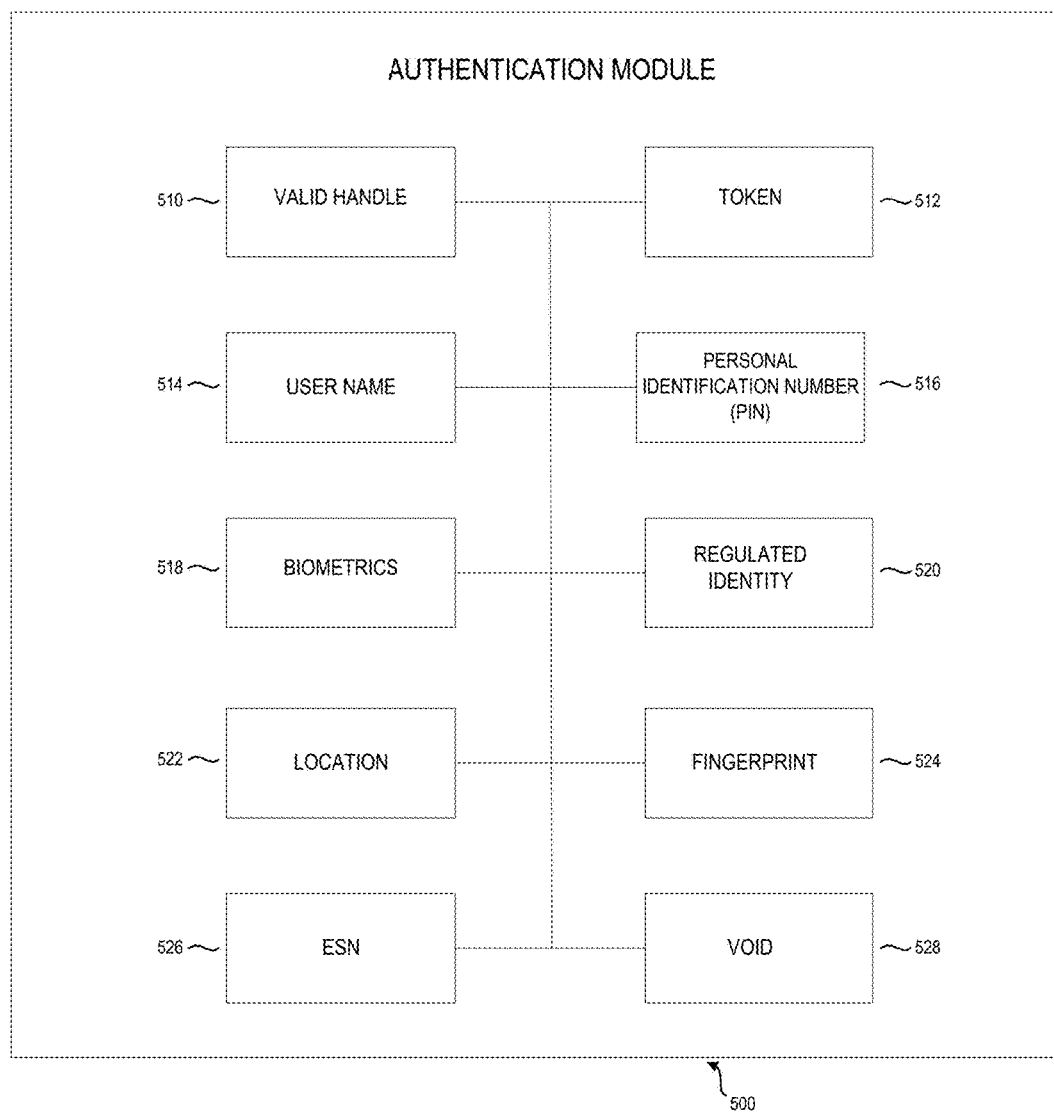
FIG. 5 illustrates one embodiment of an authentication module with example authentication mechanisms.
Figure 6:
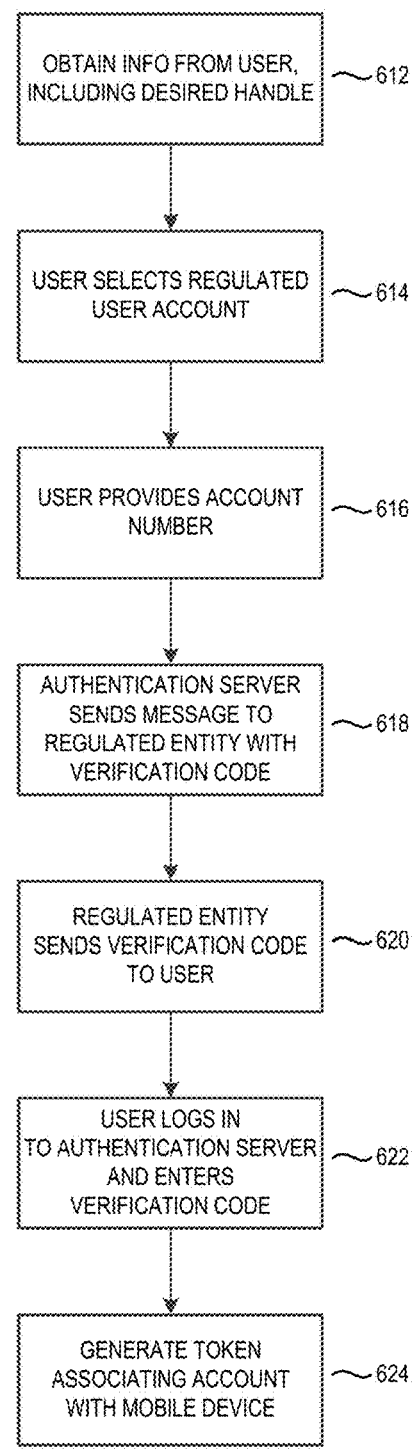
FIG. 6 illustrates one embodiment of a process for associating an account with a regulated entity.

In embodiments, authentication platform 110 can carry out multiple functions and activities. Such functions and activities can be carried out by an authentication module 114, the architecture of which is illustrated in more detail as authentication module 500 in FIG. 5. Authentication module 500 can perform a number of determinations. Authentication module 500 can determine if the received username comprises a valid handle 510. Put another way, authentication module 500 can determine if the username is a valid AuthenticationSite 110 user account name. Authentication module 500 can determine whether a specific token 512 on mobile device 130 has been used, comprising a token check. Authentication module 500 can determine if the user has been asked if he or she wishes to use a specified username to enter an authentication session in the first place 514; the user can elect whether to decline entering the authentication session, or block authentication sessions with a predetermined third-party website 150 or websites, in which case future access attempts originating from such website address or addresses will be blocked. Authentication module 500 can determine whether the user has entered a valid personal identification number (PIN) 516. Authentication module 500 can determine if the user has passed a biometrics test 518. Authentication module 500 can determine if the AuthenticationSite user account has been verified with a regulated entity 520. Authentication module 500 can determine the geographic location of the user device 130 initiating the request 522 as part of the authentication session; geo-fencing mechanisms can be utilized. A fingerprint 524 can be assessed by authentication module 500 in addition to other biometric 518 modalities. Authentication module 500 can use an ESN (electronic serial number) that is associated with an individual mobile device. Authentication module 500 can use a UUID 528, or universally unique identifier, or other identifier representing a unique person, unit or node.

It will be understood that authentication platform 110 can check to see if the user has set preferences to perform one or multiple checks. In other words, authentication platform 110 can specify which of submodules 510, 512, 514, 516, 518, 520, 522, 524, 526, 528 or other submodules can be invoked. For example, a PIN 516 and a passphrase (voice actuated) 518 can be invoked and in what sequence.

A user handle can automatically be updated. In other words, if a user changes any of the characters or other predetermined identifier(s) in the handle, then the new user handle can be immediately used on any third-party site 150 because such site will check with the authentication platform 110 each time the handle is used. Besides this updating mechanism which can occur with a new access request, the authentication platform can broadcast multiple messages to third-party websites 150 at or near the time the user handle is modified.

To enhance user security and reliability, a relationship can be established between an authentication platform ID and a regulated entity 160. To associate such a user handle with a regulated entity 160, steps can be performed which will include obtaining information from the user 612. The authentication platform can be configured to request certain Personally Identifiable Information only from a user. A non-limiting example of this information includes:
- First name, or nickname (authentication platform 110 can use this to address the user in communications.)
- State of residence (or other political subdivision)
- Zip code
- Email address
- User handle (e.g., <jack)
- Regulated entity(ies) with which user wishes to be associated 614, and user account number associated with such entity(ies) 616.

In connection with establishing the initial relationship, the authentication server 112 can send a sealed or encrypted message 618 to the regulated entity 160 or entities. The message can contain a verification code 618. The regulated entity 160 can be asked to forward the verification code to an address associated with the user 620. If the user receives the verification code from regulated entity 160, it stands to reason that regulated entity 160 has valid access to the user's Personally Identifiable Information, and a transaction can be audited (if necessary) to an actual person. A verified account can grant the user permission to access protocols that disallow anonymous users, and/or require users to be verified with this mechanism. The authentication system herein can provide for the generation of a token to associate an account with a mobile device 624. For this purpose, a third-party provider can be utilized in the role of a "trusted service manager" or TSM.

Accordingly, unlike with an approach that shares significant amounts of information, a user of the authentication platform 110 herein may—or may not—share sensitive Personally Identifiable Information. For example, the user can set preferences to share, or not share, the following when signing up for a new account with a third-party website: First name, Last name, Email, Address, City, Birthday, etc. Further, in embodiments, the system may be configured such that, for example, State is required and cannot be private, and Zip Code is required. It will be appreciated that other suitable configurations are possible as well.

As a result, in relation to setting up a third-party account, a comparison can be made between exposing information and declining to do so via the authentication platform 110 herein. FIG. 7A illustrates the kind of information required by a third-party website 150 that can ask for significant amounts of information. The user's first and last name, and other personally identifiable information is exposed. FIG. 7B, in contrast, shows that a minimum of information can be shared yet still permit authentication of the user to third-party website 150. Put another way, information in FIG. 7B is an alias of the information in FIG. 7A. The alias information does not necessarily expose information such as personally identifiable information. In an embodiment, the most that is exposed to the third-party website 150 can be the user's State and Zip Code.

By "anchoring" a user's identity to a regulated entity, the authentication platform 110 does not need to know some, much or virtually all of a user's Personally Identifiable Information. Rather, authentication platform 110 can associate the user with a regulated account.

The user can keep track of the alias information provided third-party websites 150 on which he or she has created an account by having such information available at a specified location such as an application associated with the authentication platform. This may be an app on a mobile device, an application on a personal computer, or another software-based mechanism. By way of non-limiting embodiment, authentication functionality facilitated by an app on a mobile device will be disclosed herein, and called an "authentication app".

Further, the alias email address can be routed to the authentication app. Thus, if a third-party website wishes to send an email to the alias email address 710 in FIG. 7B, the email can appear in a "Mail" section of the app. When a user reads the email, the user can have several choices including: mark the email as read; delete the email; delete the email and block future emails from the sender; forward this email to the "real" (non-alias) email address 720; forward the email and all future emails from the sender to the "real" email address 720. The "real" email address can be the email address that the user provided to authentication platform 110 when establishing his or her account.

It will be appreciated that although one third-party website 150 is illustrated in FIG. 1, indeed there can be many website partners with which the user can associate by the mechanism of authentication platform 110. Of course, the more third-party websites with which authentication platform 110 is partnered, the more powerfully the authentication mechanism herein can be leveraged. There can be multiple security checks performed by authentication platform 110 in order to partner on a trusted basis with a third-party website. Certain checks can be performed, including but not limited to validating via a SIM token associated with mobile device 130, a PIN, biometrics, and/or other form of validation such as those disclosed in FIG. 5. Of course, not all checks can be used, and additional checks can be used. Upon successful completion of such checks, authentication platform 110 can deliver a complex and potentially randomized username and password to the third-party website 150. This username and password can be recognized as valid by third-party website 150. In addition, the username and password can be encrypted and stored on authentication platform 110, and on the authentication app. The username and password can be randomly generated for each third-party access, and be made available on the user's app. Authentication platform 110 assumes that the user device 130 is in operative communication with a network 140 such as the Internet. If mobile device 130 is not so connected, then the user's app can inform the user of a given username and password to a given third-party website 150 at a desired time.

Although in embodiments the password field 350 can be left blank, it is optional to enter a password as an alternative to embodiments of an authentication system herein. In this embodiment, the user can manually enter and keep track of passwords. Thus, the user can have the convenience of one username for many sites, but will need to manually enter a password. Authentication platform 110 may or may not be furnished this password by the user. Authentication platform 110 can also be used within networks comprising multiple intercommunicating nodes, e.g., an "Internet of things" where one node can establish an authenticated relationship with another node. Thus, "user" can embrace a suitable node, human or not, within a network of nodes.

Authenticating a User to a Third-Party Website

Providing further context to that associated with the descriptions in connection with FIGS. 2-7, in embodiments, a user can interact with a user device 130 in order to take advantage of the features of authentication platform 110. Exemplary illustrations of user device 130 screen displays (e.g., screenshots) that can assist in carrying out this interaction are now given. It will be apparent that these are non-limiting embodiments for the purposes of illustration, and that numerous graphics, functionality and other mechanisms of carrying out embodiments are possible.

Figure 8:
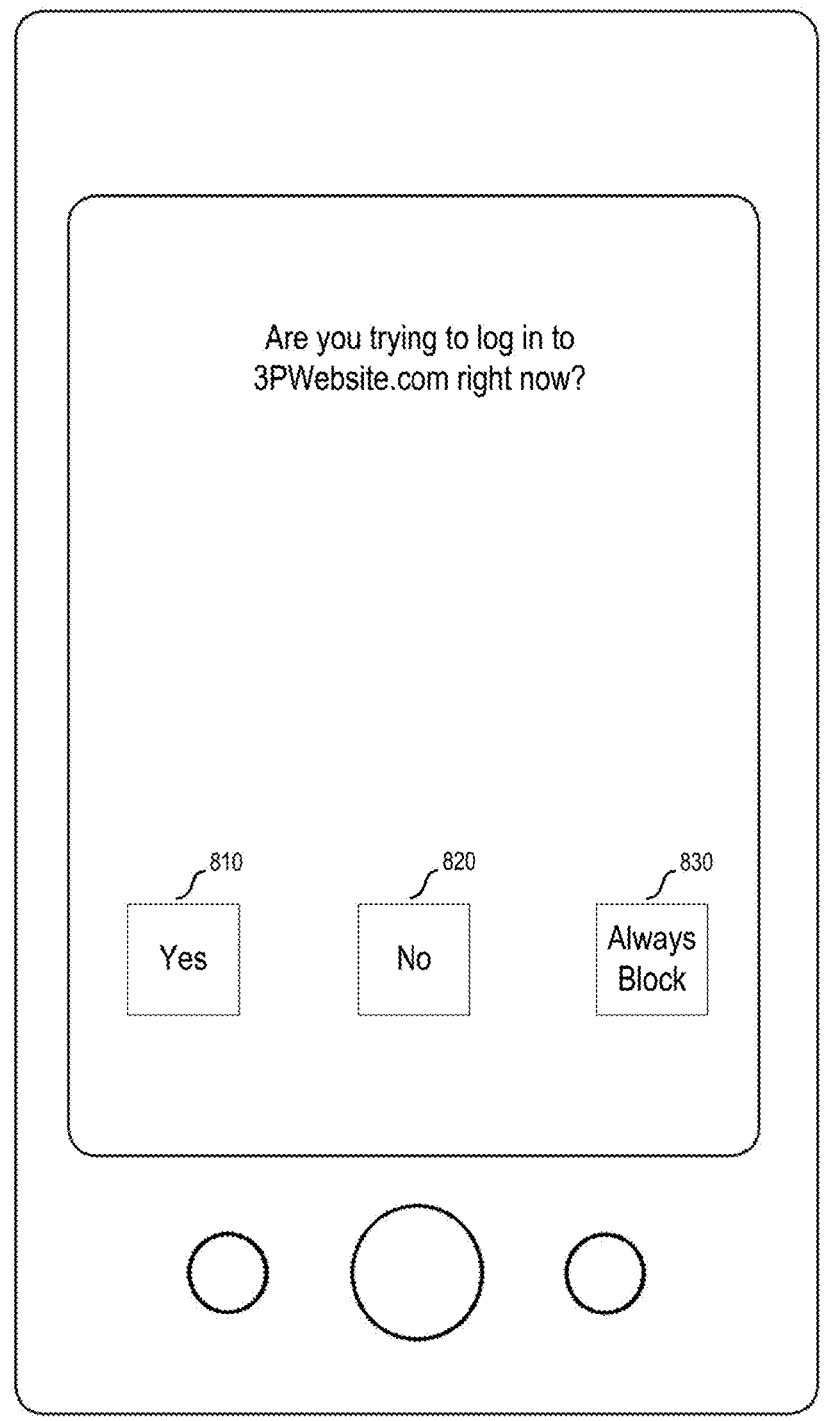
FIG. 8 represents one embodiment of an authentication screen for obtaining access to a third-party website.
Figure 9:
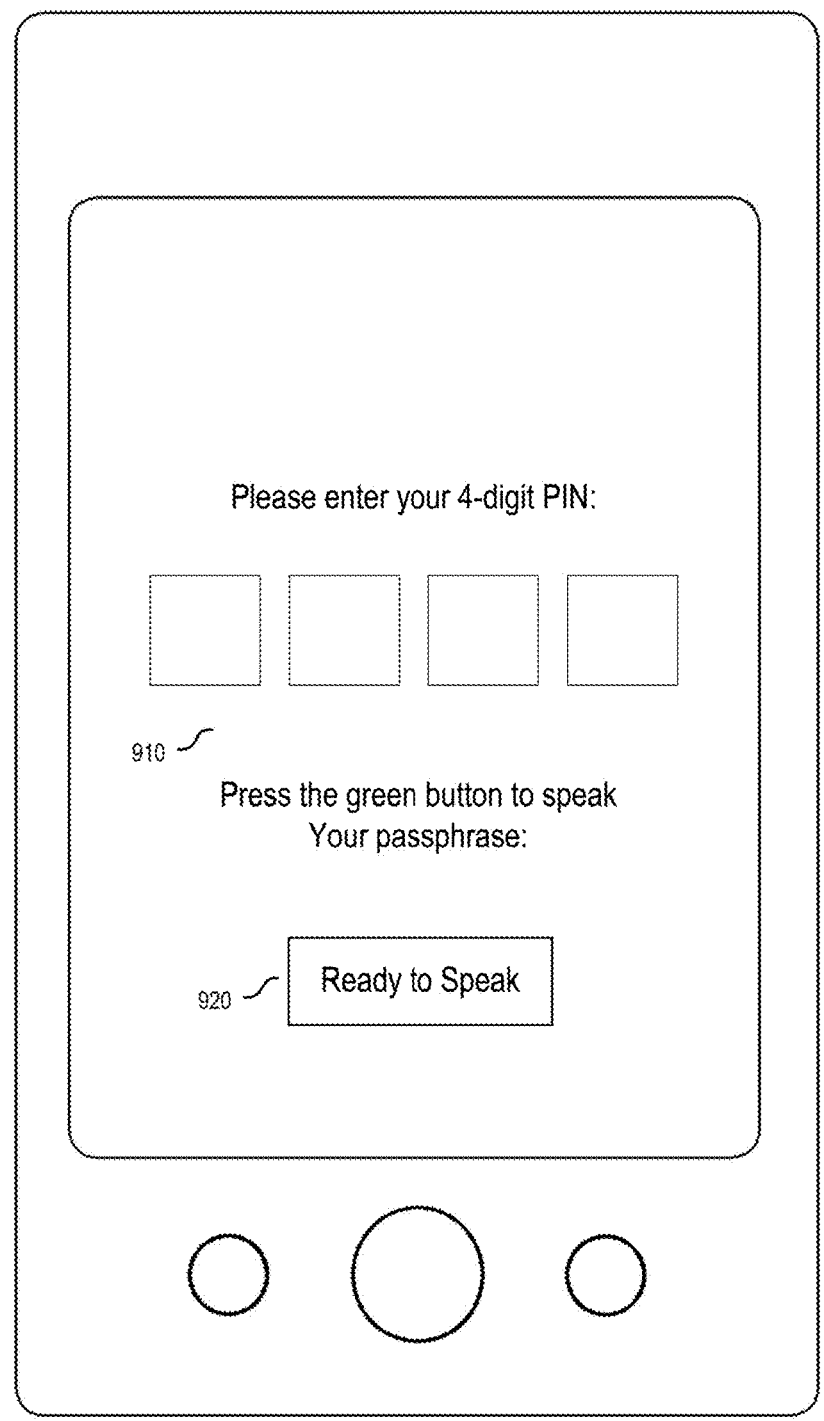
FIG. 9 represents one embodiment of a screen display relating to a PIN and passphrase.

The user can be asked if he or she is setting up a new account with 3PWebsite 150 using authentication platform 110. Thus, the display may include the buttons "I Need a New Account" and "I Already Have an Account". If the user needs a new account, the user can actuate the "I Need a New Account" button. Consequently, an example screenshot as in FIG. 8 can be presented. Once again, third-party website 150 can also be referred to as 3PWebsite. If the user actuates a button representing "No" 820 or "Always Block" 830, then the authentication attempt will fail. These may be chosen if the user believes an attempt to use the app is unexpected or malicious. However, if the user actuates a button representing "Yes" 810, then authentication platform 110 can check to see if the user has set preferences to perform an additional check, such as PIN 516 or passphrase (or other biometric 518 feature). Authentication platform 110 can also check to see if 3PWebsite 150 requires an additional check such as but not limited to a PIN or passphrase. If either the user or 3PWebsite 150 requires a PIN and/or passphrase, or other check, then the user app can render a display such as that illustrated by FIG. 9. In other words, the user can be prompted to enter a 4-digit PIN 910, and/or speak a passphrase after actuating a button 920.

It will be understood that authentication platform 110 can "wake up" the user's mobile app. That is, once a user enters a user handle on an application associated with 3PWebsite 150, a message can be sent from 3PWebsite 150 to authentication platform 110. Authentication platform 110 can "wake up" the user's mobile app.

Figure 10:
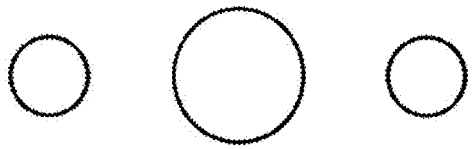
FIG. 10 illustrates one embodiment of a screen display enabling a user to manage authentication parameters.

As illustrated in FIG. 10, the user can control multiple aspects of the interaction with 3PWebsite 150. For example, the user app can contain security checks that the user app can carry out when interacting with 3PWebsite 150. These can include First Name 1010, Last Name 1012, Address 1014, City 1016, State 1018, Zip 1020, Email 1022, Marital Status 1024, Sex 1026, and Occupation 1028. Check boxes can be associated with each of these fields. A check can be placed by the user on a field he or she is willing to share, and then the user can transmit this information to AuthenticationSite 110 by a mechanism such as actuation of button 1030.

Figure 11:
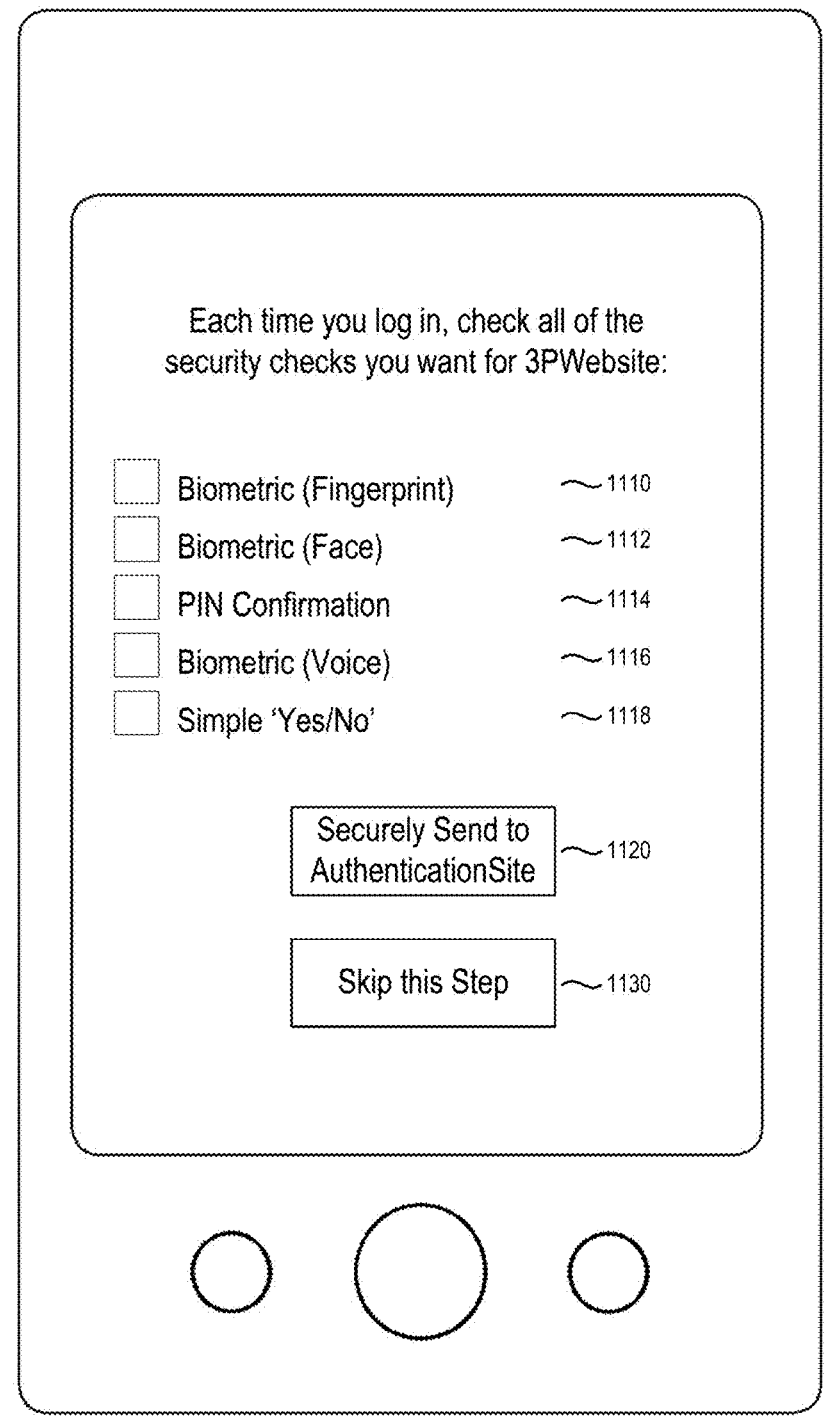
FIG. 11 illustrates one embodiment of a screen display enabling a user to manage authentication parameters.

FIG. 11 illustrates security checks chosen by the user employed when interacting with 3PWebsite 150. These can include but are not limited to a biometric (fingerprint) check 1110, a biometric (face) check 1112, a PIN confirmation 1114, a biometric (voice) check 1116, and/or a simple "Yes/No" 1118 in which a user can transmit a "Yes" or "No" as part of the process. Further, security checks can include an email from the authentication platform 110 to the user, a location of the user device 130, relationship of the user with a regulated entity 160, and an identifying feature that uniquely identifies the user device 130, such as but not limited to an ESN, UUID, or other feature. A button can be actuated to send the desired check information to AuthenticationSite 110. Alternatively, this step can be skipped 1130.

FIG. 12 illustrates data the user has provided 3PWebsite; here the user has elected to share zip code 1224 only. Again, multiple suitable configurations are possible. FIG. 12 illustrates that zip code 1224 and state 1220 are provided; the remaining information can be encoded or otherwise protected. For example, an agreement can be made in advance or concurrently between authentication platform 110 and each third-party server 150 on methods to handle such as encryption/decryption protocols. Zip code 1224 and state 1220 are essentially publicly available information as determined by the user or enterprise.

At a point when the user enters a valid handle in the username field 340, authentication platform 110 can proceed to commence an authentication process with 3PWebsite 150. User device 130 can indicate the process is being undertaken by a suitable graphical representation. If access is granted, user device 130 can indicate this status to the user by language such as "Access Granted".

Figure 13:
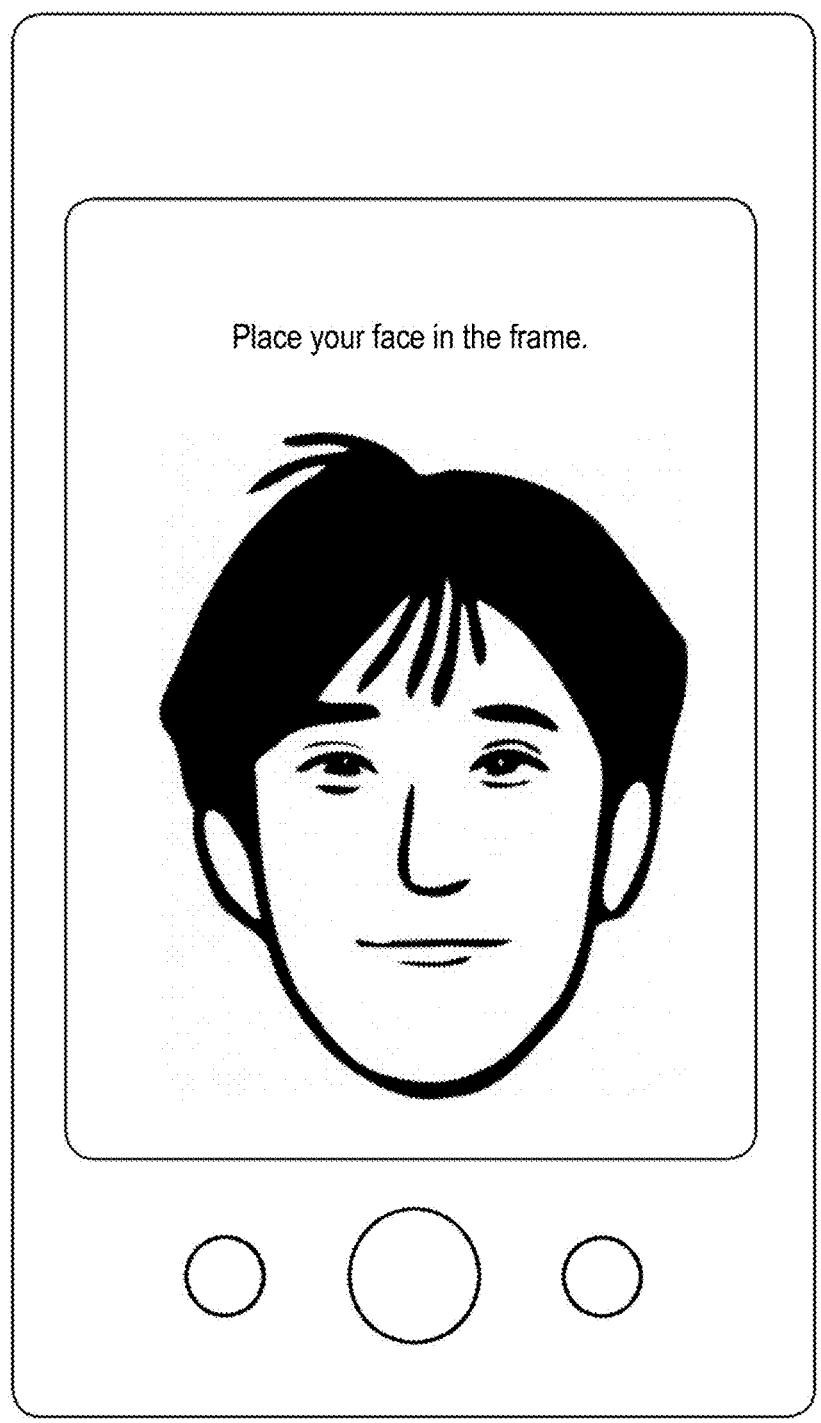
FIG. 13 illustrates one embodiment of a biometric authentication parameter.

Security factors can be employed in connection with the authentication process. FIG. 13 shows a biometric check such as face recognition, where the user employs an optical mechanism associated with user device 130 to image his or her face. This option is available to the user and to the third-party website 150. Thus, because the authentication process can be carried out in connection with a mobile device, no added hardware can be needed to perform authentication functions.

It will be recognized that third-party server 150, or another component herein, can perform functions by means of a modular architecture based on intended functionality. For example, third-party server 150 can have an identifier-detection module to act on a communication from a user, and a forwarding module to transmit a message to an authentication server.

User Registration with Authentication Platform

Figure 14:
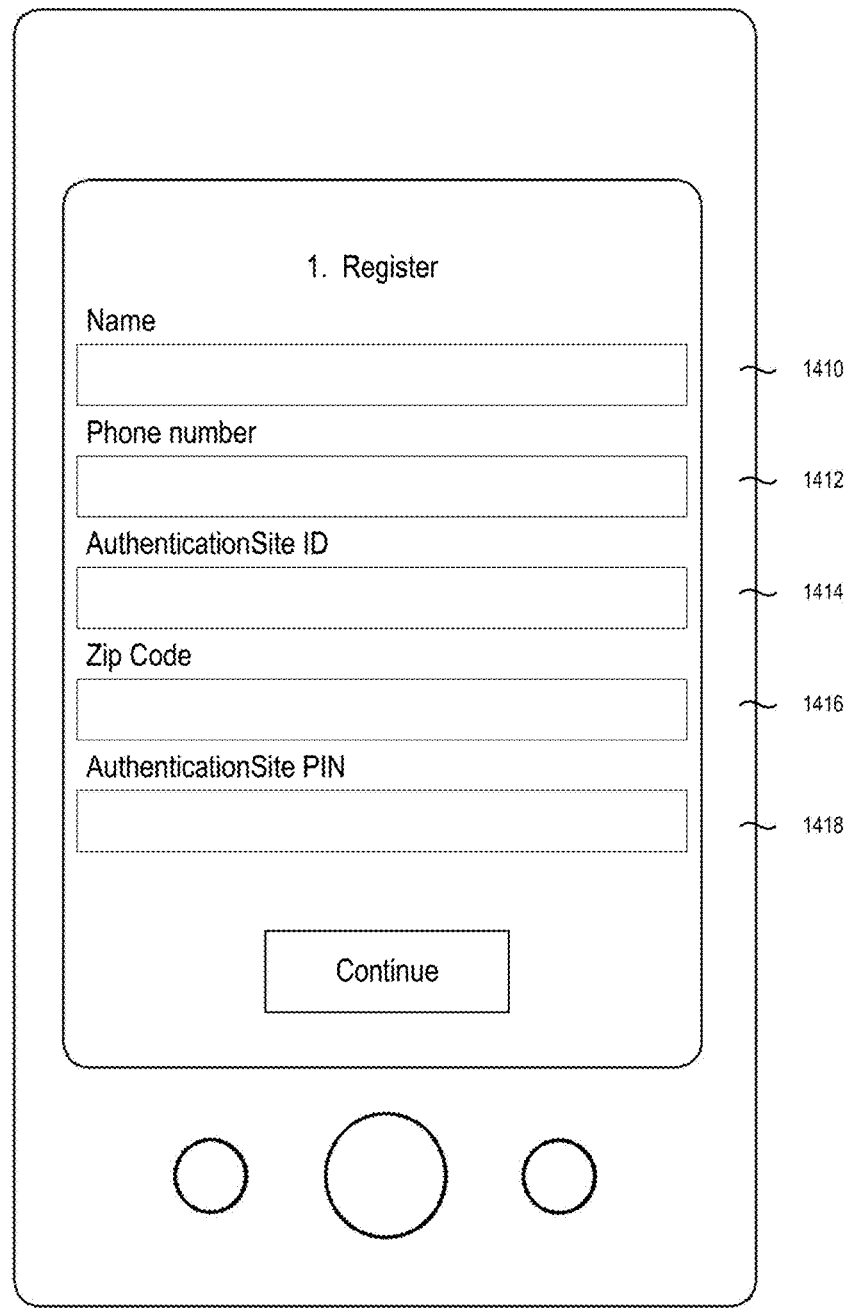
FIG. 14 illustrates one embodiment of a screen display illustrating a mechanism to facilitate registration with an authentication platform.
Figure 15:
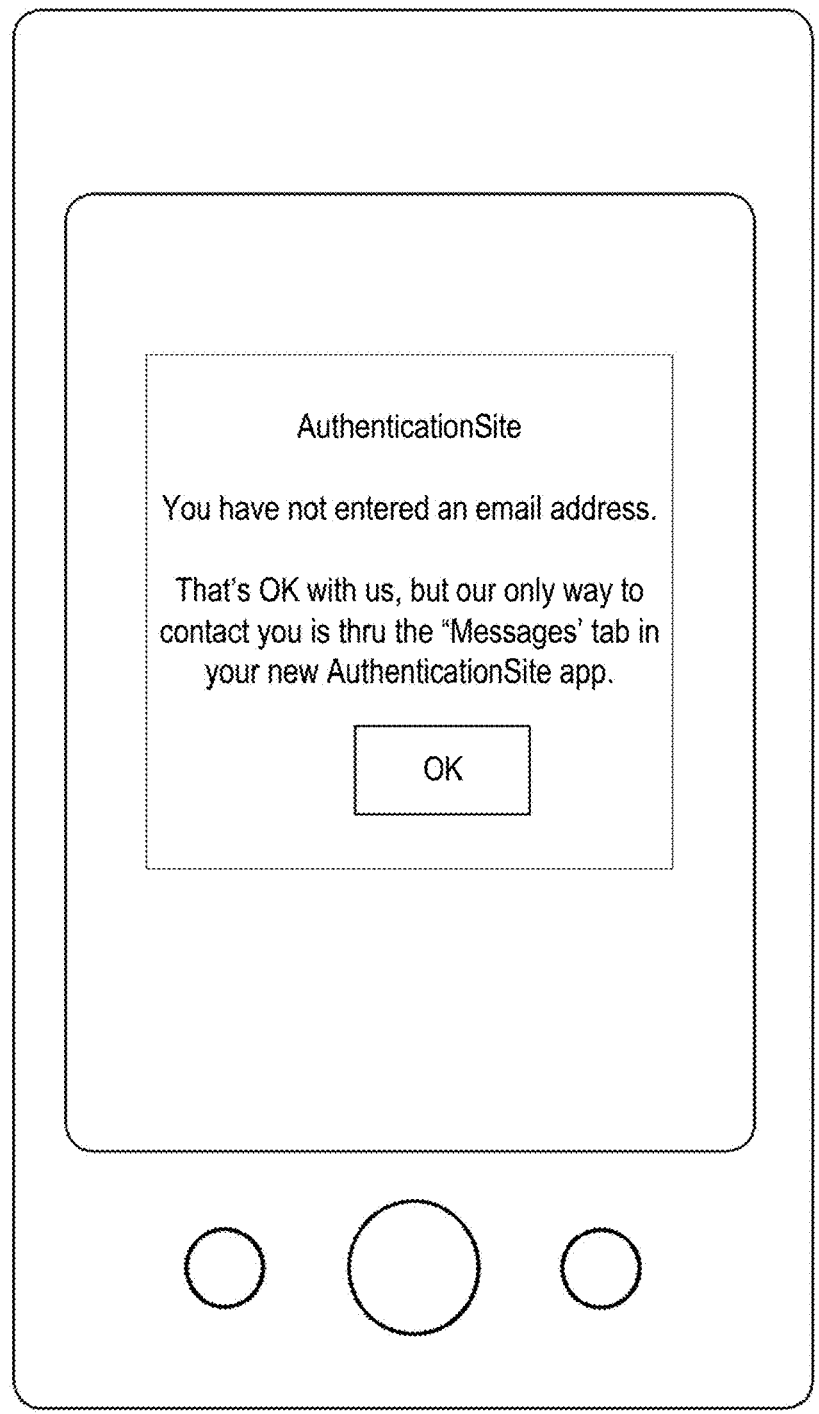
FIG. 15 illustrates one embodiment of a screen display illustrating a mechanism to facilitate registration with an authentication platform.

FIG. 14 is an embodiment of a display facilitating registration by a user with authentication platform 110. A user can provide a name (or nickname) 1410, a phone number 1412 (e.g. mobile phone number), AuthenticationSite ID 1414 (i.e., handle), a Zip Code 1416 (which can be verified with a mobile network operator), and a PIN 1418. Certain of this information can be made optional, such as email (not shown). If an email field is provided but an email address is not entered, user device 130 can display a screen indicating that an email address was not entered, as illustrated in FIG. 15. The screen display indicates that a manner of contacting the user can be via a "Messages" tab on the user app. In this fashion, the user does not have to disclose his or her personal email address.

Figure 16:
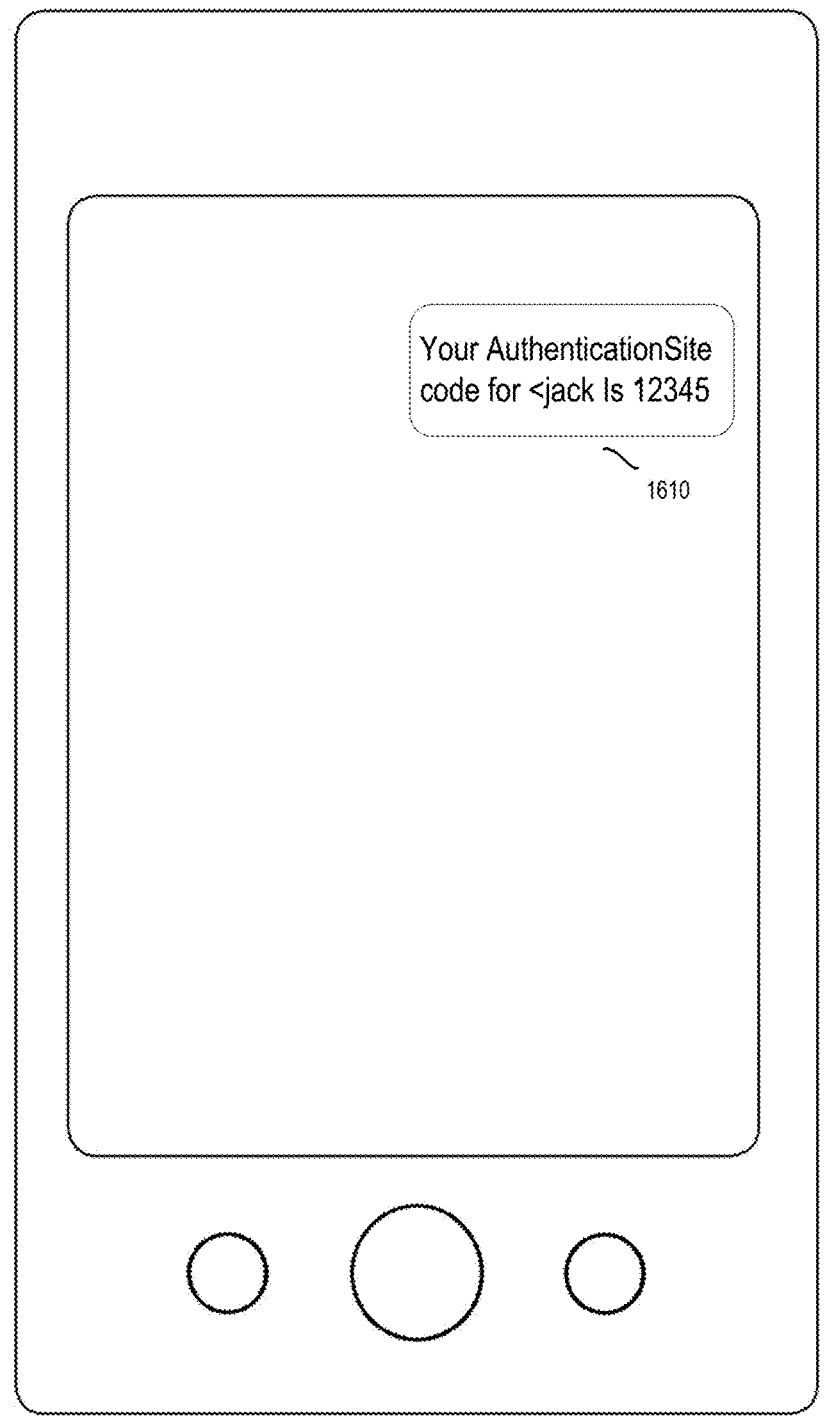
FIG. 16 illustrates one embodiment of a text message providing a verification string.
Figure 17:
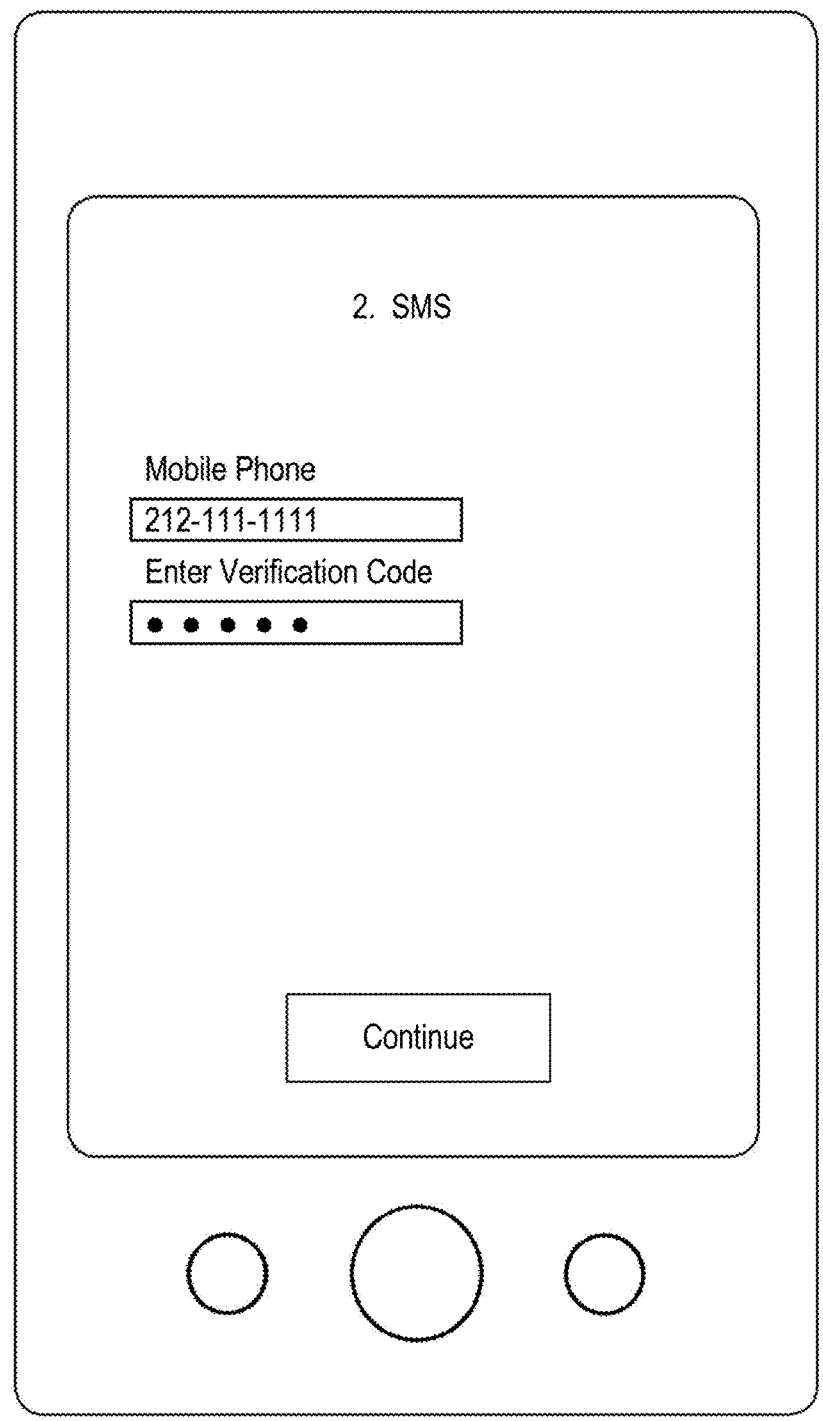
FIG. 17 illustrates one embodiment of a screen display illustrating mechanism to facilitate registration by entering a verification string.
Figure 18:
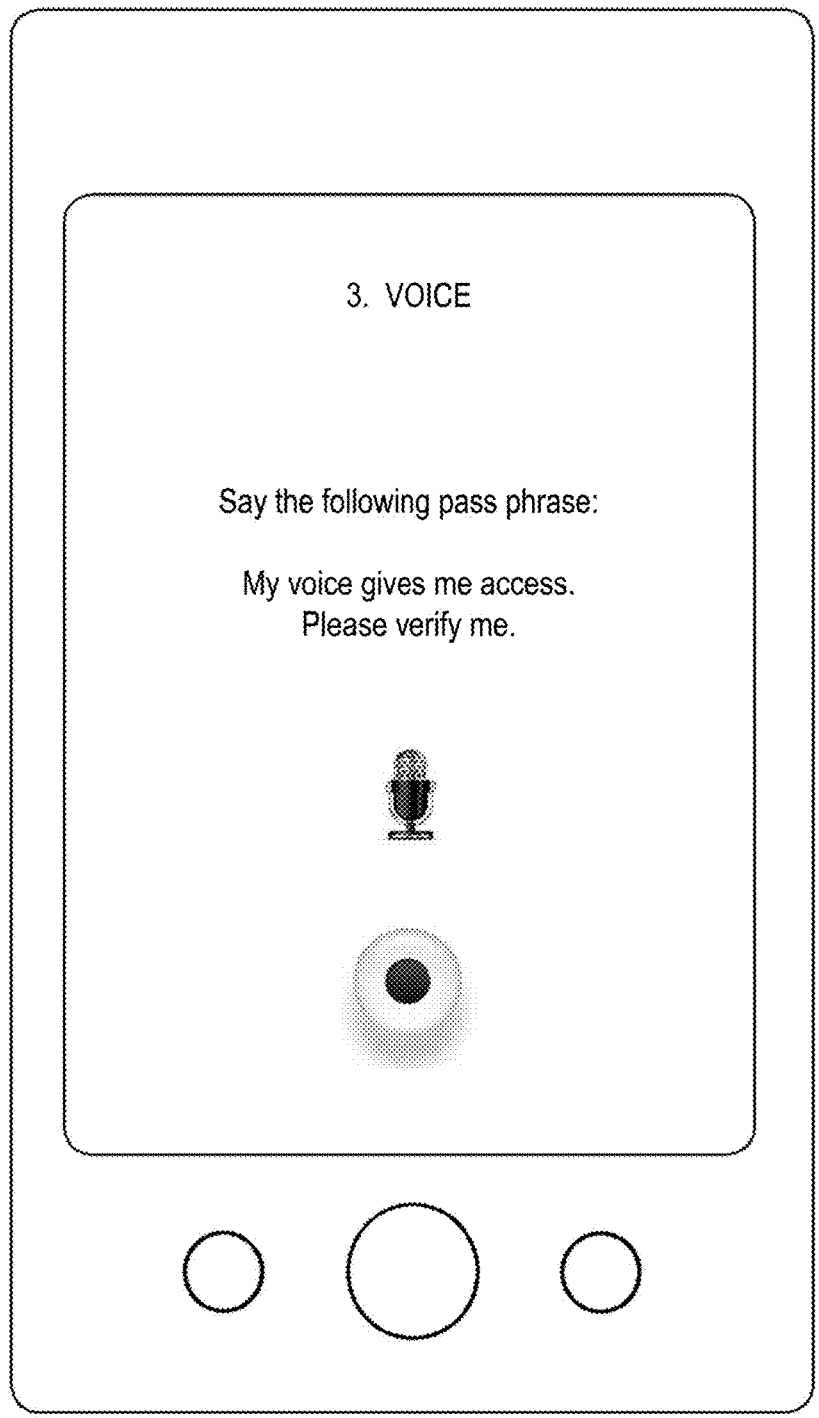
FIG. 18 illustrates one embodiment of a biometric authentication parameter.

FIG. 16 illustrates an embodiment for a mechanism of continuing with registration, here verification of user device 130. The user provides a phone number to authentication platform 110 for authenticating handle 1414. A message, such as an SMS message, with a one-time password (OTP) 1610 can be sent to user device 130 to verify the device. As illustrated in FIG. 17, the correct OTP 1610 can be entered by the user. As illustrated in FIG. 18, the user can be prompted to read a number of words that provides a sample of the user's voice to authentication platform 110. Authentication platform 110 can use this sample of the user's voice to complete account authentication processes in the future. Of course, it may be the case that other biometrics may be used as well or in place of the voiceprint. The suite of authentication factors offered to the user, and/or required by authentication platform 110 can be influenced by several factors including statutes or rules, such as the Americans with Disabilities Act (ADA), that may be relevant to engaging in business or otherwise interacting with the U.S. government or other entities.

Figure 19:
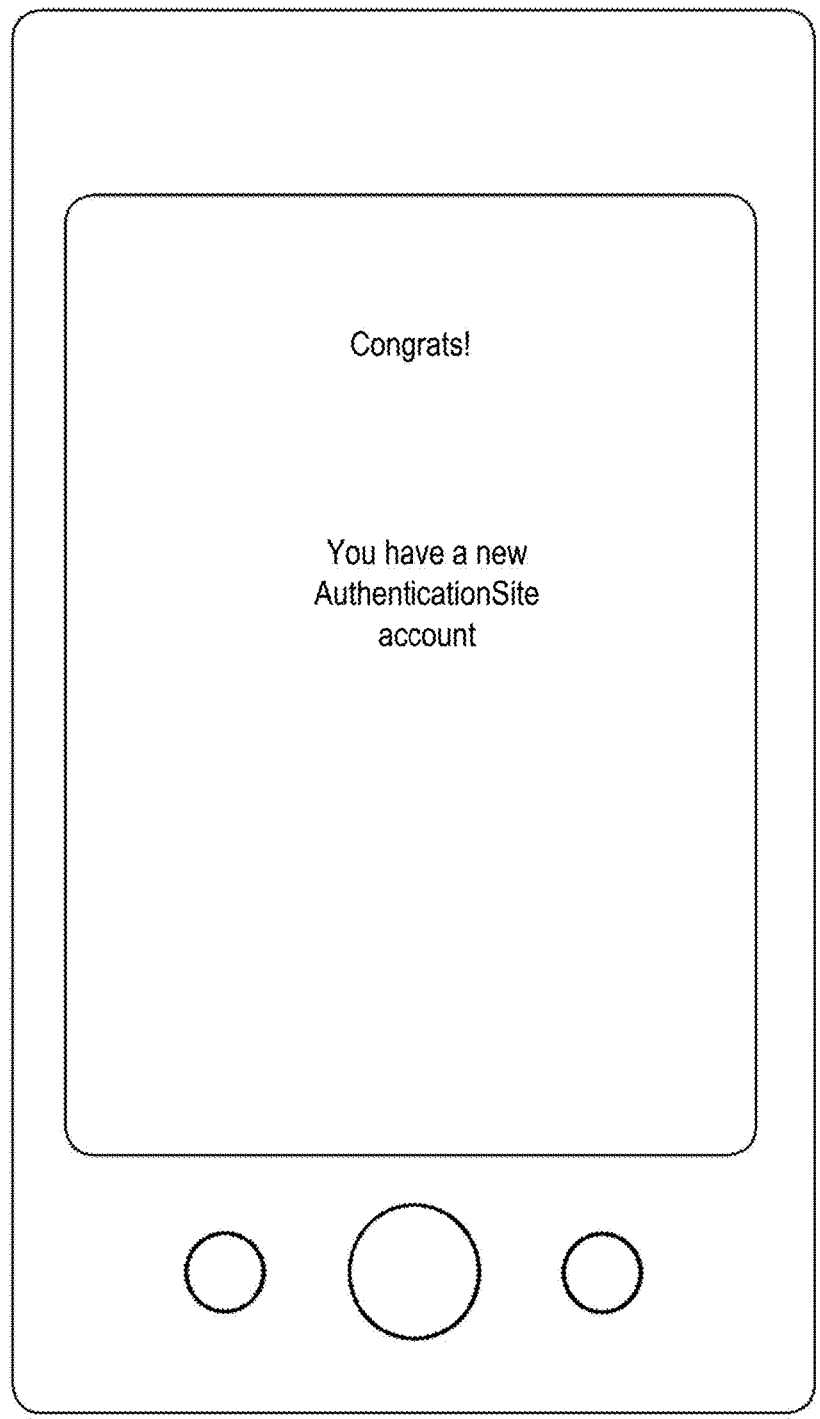
FIG. 19 illustrates one embodiment of a screen display indicating that an account has been successfully established with an authentication platform.

FIG. 19 illustrates an example screen display indicating that the user has successfully established a new AuthenticationSite account associated with authentication platform 110, and the user is able to start using the account to authenticate on or otherwise access third-party accounts.

Initially Accessing a Third-Party Website

Figure 20:
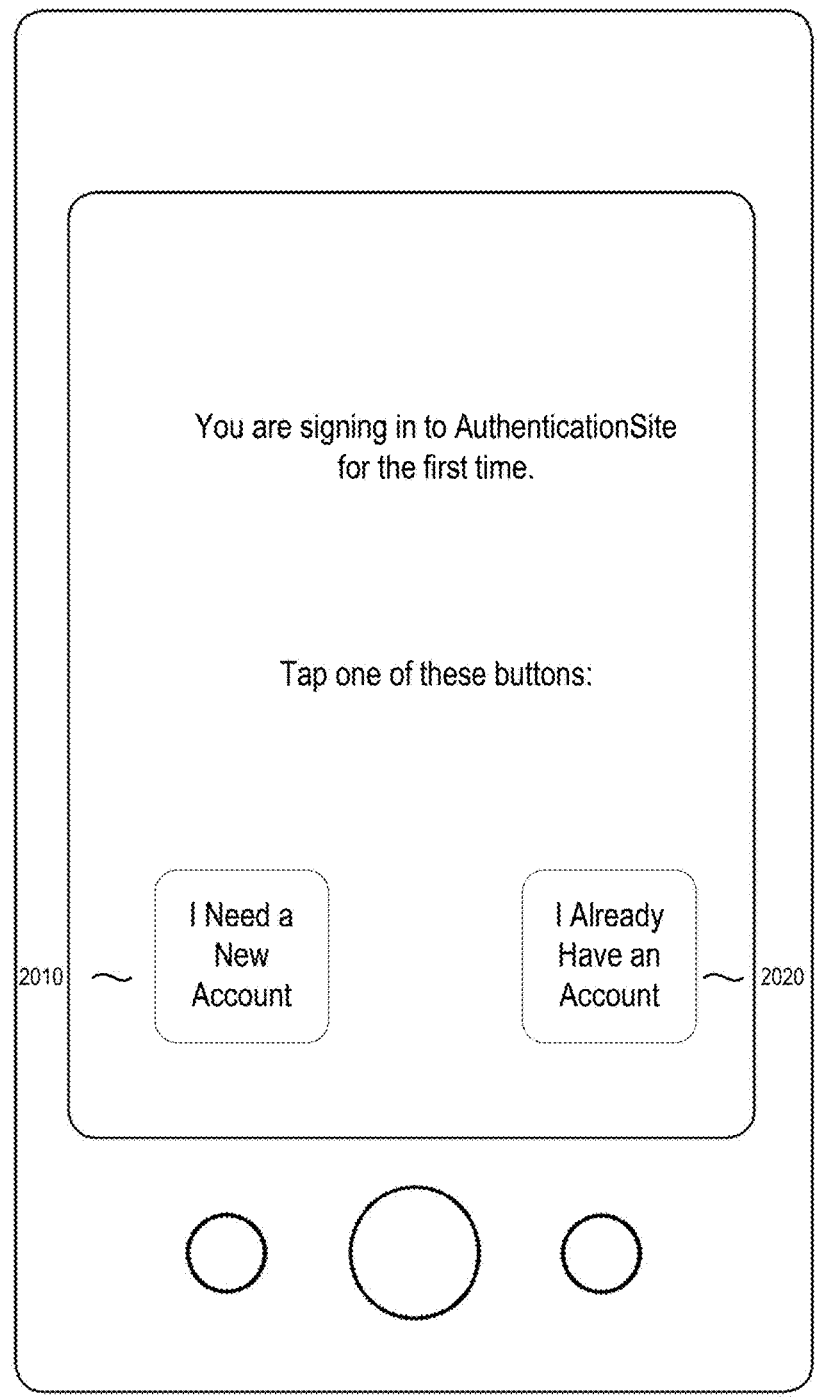
FIG. 20 illustrates one embodiment of a screen display asking the user if an account has been set up with a third-party website.

Providing further context to that provided above, as a further example, assume that the user is attempting to access www.3PWebsite.com, which has partnered with AuthenticationSite, for the first time. The user can enter merely the user's handle 1414, leaving the password field blank, and actuate a button causing a sign-in attempt. As a result, a screen can be displayed such as the example screen in FIG. 20, which asks the user to actuate a button indicating that the user needs a new account 2010 or already has an account 2020. If the user already has an account with 3PWebsite.com, the user can actuate button 2020.

At this point an example screen can be displayed like that in FIG. 11, indicating selected security protocols that can be employed to gain access to 3PWebsite.com. And, partner site 3PWebsite.com can require certain security protocols as well in order to grant access; if this is the case, certain boxes can be pre-checked and unable to be changed.

User has Existing Account with Third-Party Website (Partner)

Figure 21:
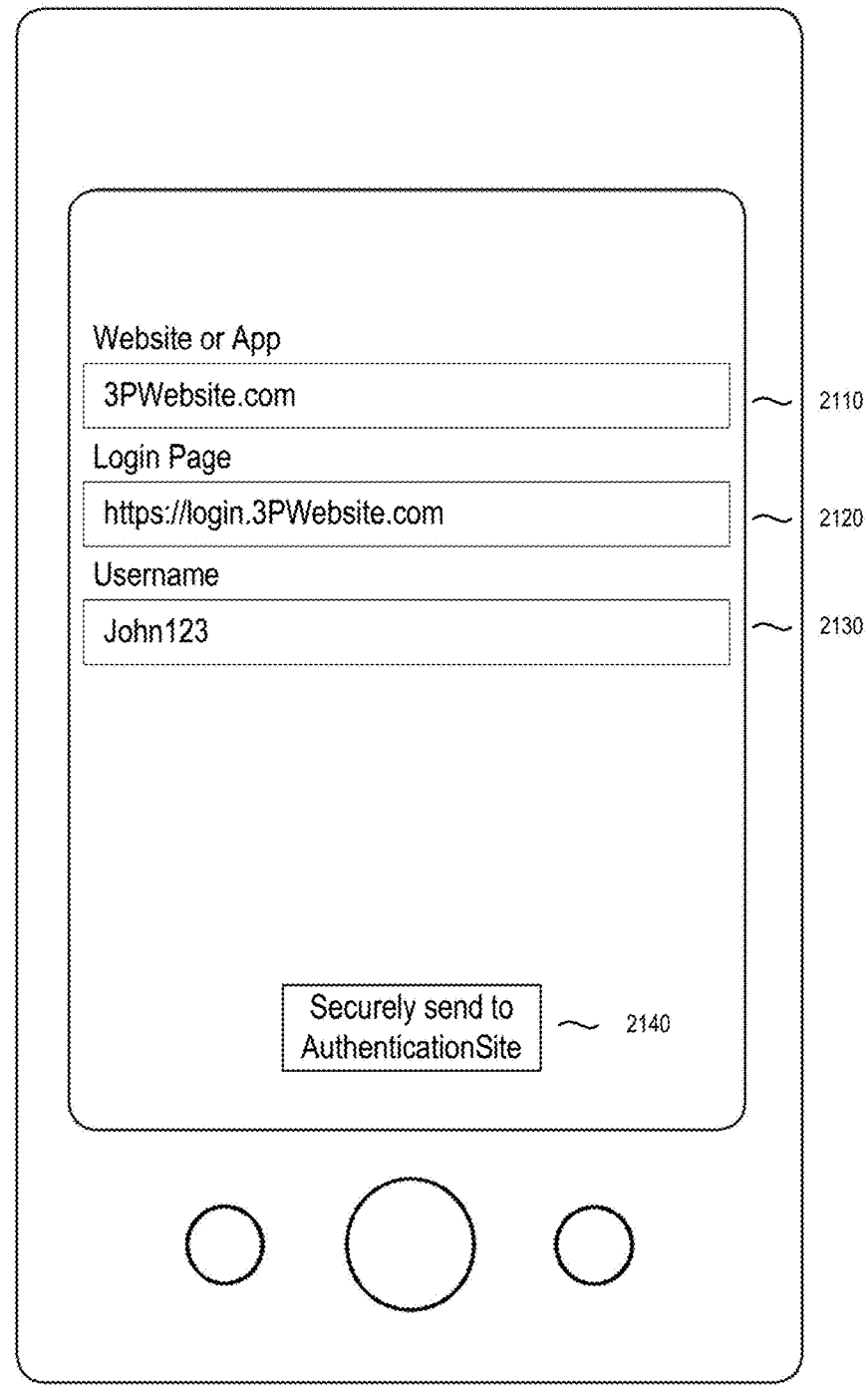
FIG. 21 illustrates one embodiment of a screen display illustrating a mechanism for obtaining access to a third-party website.

It may be the case that the user has a preexisting account with 3PWebsite.com, and 3PWebsite is a partner of AuthenticationSite. The user wishes to continue using his or her existing account but access the account using handle 1414 instead of the current username and password. To facilitate doing so, authentication platform 110 can capture the current username, and other information, to help match handle 1414 with the preexisting account. FIG. 21 shows an example screen that can assist with this process, disclosing the website or app 2110 to which the user wants to create authentication access, login page 2120, and username 2130. When this information is entered, the user can send the information to AuthenticationSite 2140.

Figure 22:
FIG. 22 illustrates one embodiment of a screen display illustrating a mechanism for obtaining account access to a third-party website.
Figure 23:
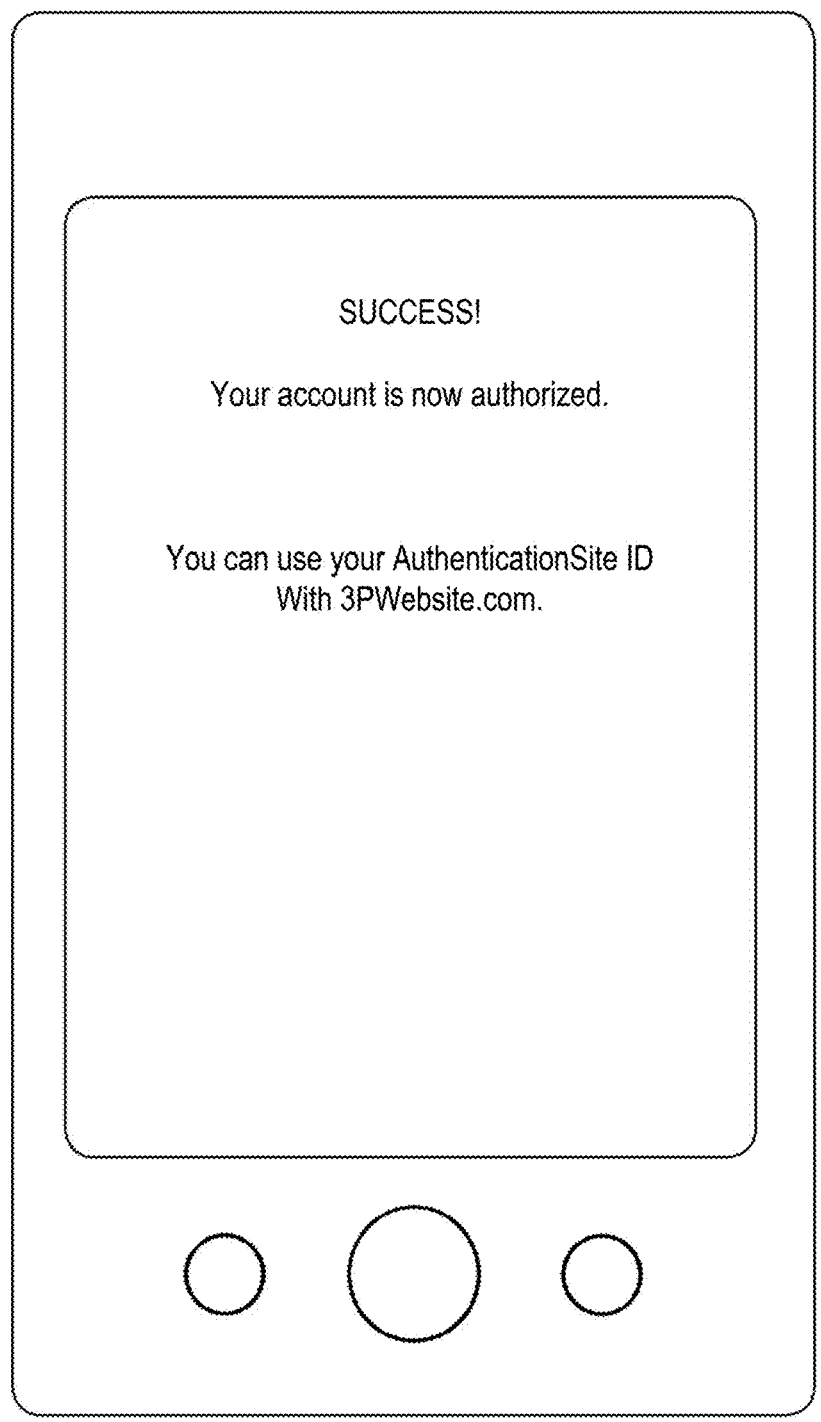
FIG. 23 illustrates one embodiment of a screen display illustrating that account access to a third-party website has been authorized.

An email or other message can be sent from 3PWebsite to the user. The email can contain a code that must be entered in mobile device 130. This allows 3PWebsite to validate the authenticity of the user's identity by sending a one-time password to the email on file in the existing account of 3PWebsite. FIG. 22 shows an example screen display wherein the user can enter the activation code obtained from 3PWebsite.com. Once the correct activation code has been entered, as shown in FIG. 23 the user's handle 1414 is now available for use on 3PWebsite.com.

User has Existing Account with Third-Party Website (Non-Partner)

Figure 24:
FIG. 24 illustrates one embodiment of a screen display relating to access to a non-partnered third-party website.

In the instance where authentication platform 110 has yet to be associated with a specified 3PWebsite 150, the user can be asked to provide authentication credentials so that certain fields can be prefilled in relation to future requests, as seen in the example screen display in FIG. 24. At any point in the future, provided the user is logged into the user app, the user app, when communicating with a "non-partnered" site, can notify the user of the stored authentication credentials and request the user to authenticate using security protocols (e.g., biometrics, PIN, etc.). Once authenticated, the user app can fill in the authentication credentials for the user, and the user can actuate a button to sign-in.

Authentication App Functionality

Figure 25:
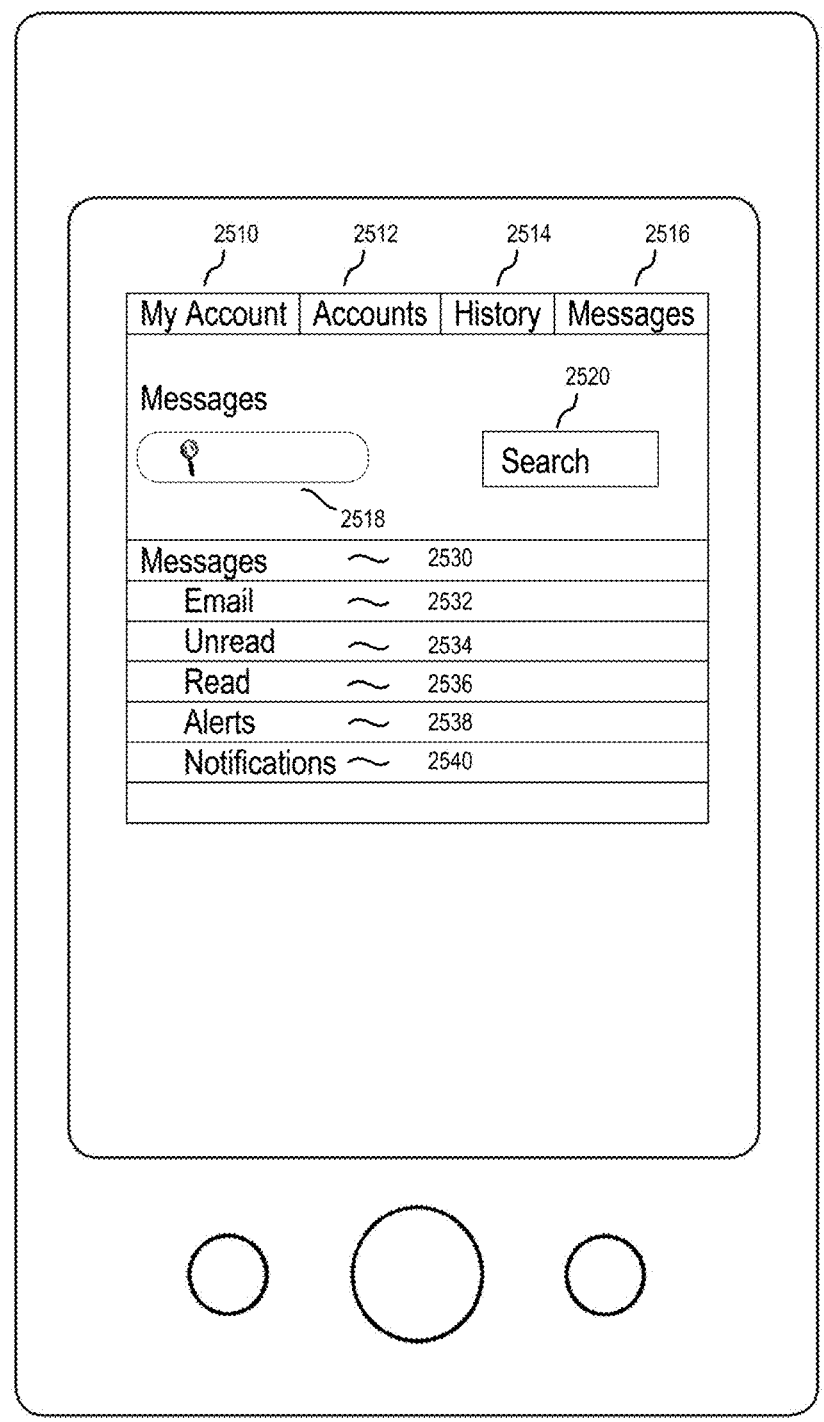
FIG. 25 illustrates one embodiment of a screen display relating to a graphical user interface for performing various functionality.

FIG. 25 shows an example screen display illustrating functionality that can be made available via an authentication app. This functionality includes account management, email and message functionality. For example, message notifications 2540 can be sent to the user and viewed within a Messages tab 2516 (or other suitable tab). The user may select that emails from third-party websites be sent to the Messages tab 2516, preventing unwanted messages from being sent to the user's personal email address. From the Messages tab 2516, a user can forward messages to his or her personal email address, or another email address. In addition, the user will be allowed to forward future emails to the user's email address. Also, the user can delete a single message, or all future messages from a specified sender. This can provide the user maximum control over emails, including "junk" or undesired emails. Commands available for each email can include: forward to my "real" email; forward all future emails from this sender; delete; delete all future emails from this sender; and many more.

In addition, the authentication app can manage Personally Identifiable Information shared with partnered third-party websites 150. This can be useful in the event the user needs to share certain Personally Identifiable Information to take advantage of products or services on a given website. The user can also use this functionality to access "backup" authentication credentials if the user has no user device service capability (e.g., no phone service) and the user needs to authentication to an account. For example, an interface may be displayed (not shown) that provides each account and, if a user actuates a "Manage" button associated with the account, the user can see and/or edit alias data, actual data, online passwords, and other associated information.

A user has the ability to modify his or her personal details by actuating the My Accounts tab 2510. Such details can include Name, handle, Zip Code, PIN for authentication platform 110, and email for authentication platform 110.

Further, activity associated with the user account can be stored and displayed as desired by the user. The user can actuate the History tab 2514 to see which third-party websites he or she has accessed successfully, which access attempts were unsuccessful, and other information relating to activity.

Authentication Process Scenarios

FIGS. 26-34 illustrate diagrams relating to non-limiting example embodiments of an authentication process herein. Highlighted are various inputs or services playing a role in the authentication process, e.g., that of a user device 2610, partner platform 2612, authentication-site platform 2614, 2616 smartphone app (M2M), and smartphone app (human).

Figure 26:
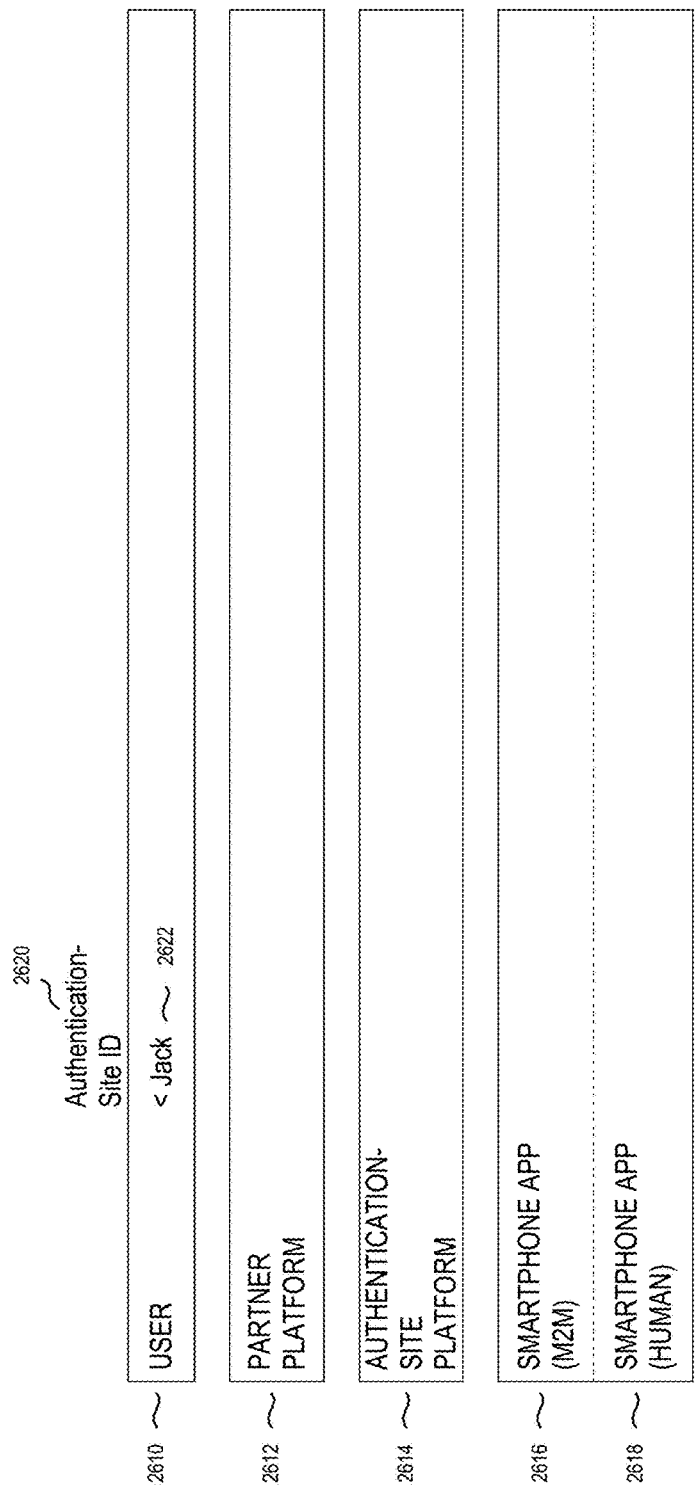
FIG. 26 illustrates one embodiment of an operational scenario by which access to a third-party website can be gained by the mechanism of an authentication platform.

FIG. 26 illustrates that a user 2610 enters (such as at a user device 130) an AuthenticationSite ID (handle) 2620 in the username field 320 of a third-party website 150 (here also referred to as partner platform 2612) that has partnered with authentication platform 110 (here also referred to as AuthenticationSite platform 2614). Here, the handle is <Jack 2622.

Figure 27:
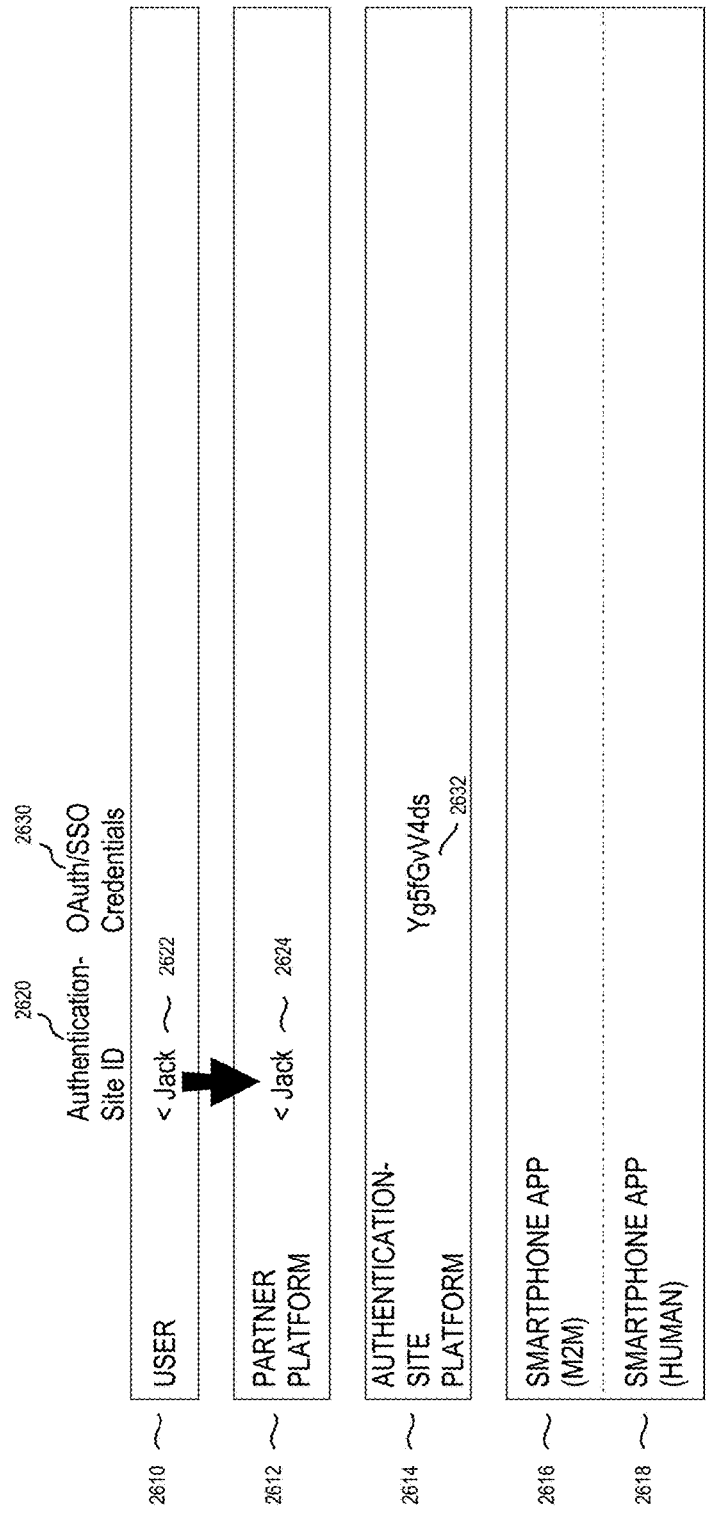
FIG. 27 illustrates one embodiment of an operational scenario by which access to a third-party website can be gained by the mechanism of an authentication platform.

FIG. 27 illustrates that a user can transmit the information to partner platform 2612, such as by entering an authentication site ID 2622—from any computer or device—into the username field of a partnered site. Partner platform can check the credentials for the handle 2622 and determines that the information received comprises an authentication site ID 2612 because a predetermined identifier—here the < character—is detected in a specified portion (here, the "prefix") of the string 380, and a password is absent. Partner platform 2612 can use software, such as that provided by authentication site platform 2614, to check to see that the handle is valid, and to identify which partner account can be accessed by user 2610. After authentication site platform 2614 receives a suitable communication from partner platform 2612, authentication site platform 2614 can send a certificate 2632, previously established between authentication site platform 2614 and partner platform 2612, to partner platform 2612 authenticating the user. The credentials 2630 referred to, which may include those related to the certificate, can be based on an OAuth framework, which can enable secure access via a network with single sign-on capabilities. Credentialing within a secure format can also be accomplished by another framework, such as but not limited to SAML.

Figure 28:
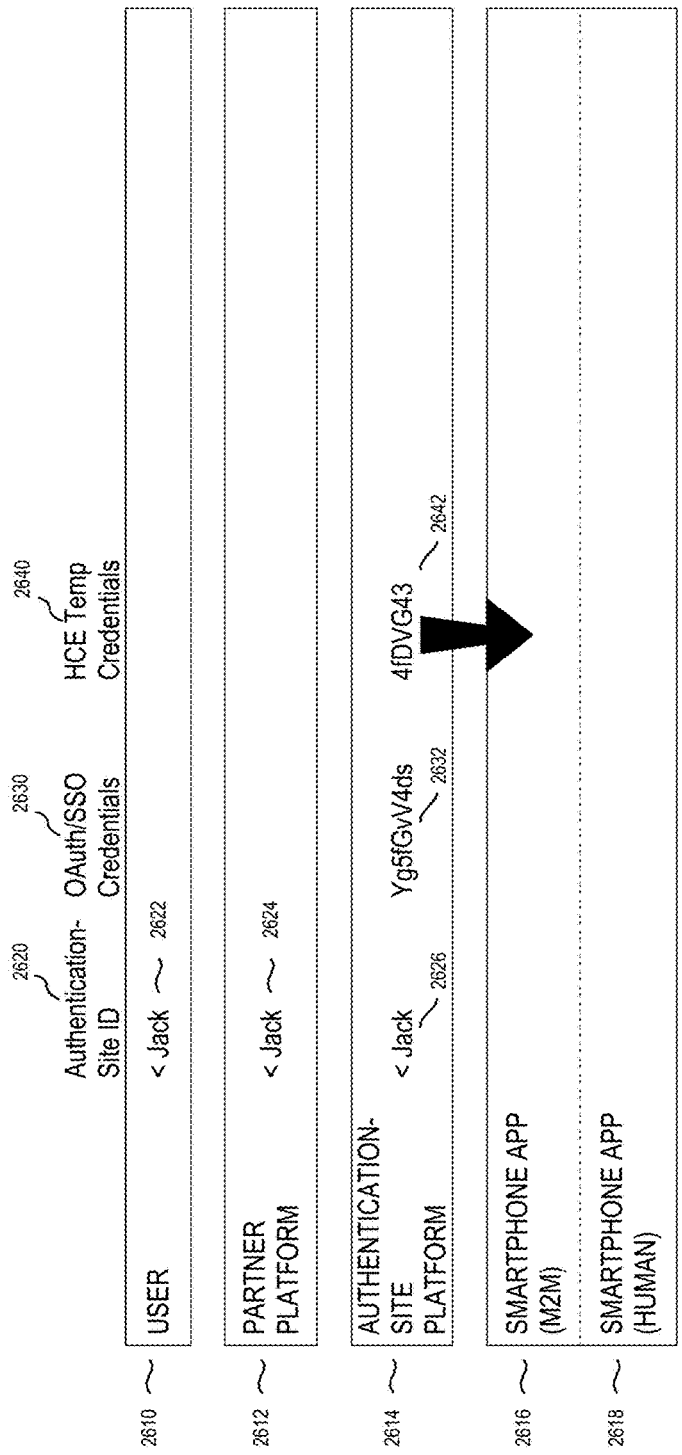
FIG. 28 illustrates one embodiment of an operational scenario by which access to a third-party website can be gained by the mechanism of an authentication platform.

FIG. 28 shows an example where authentication site platform 2614 can be part of a secure communication between authentication site platform 2614 and an authentication app (e.g., smartphone app (M2M) 2616) on for example a user device 130. This secure communication functionality can be accomplished by Host Card Emulation or comparable technology. Here HCE temporary credentials 2640 are recognized by authentication site platform 2614 in the form of a credential 2642.

Figure 29:
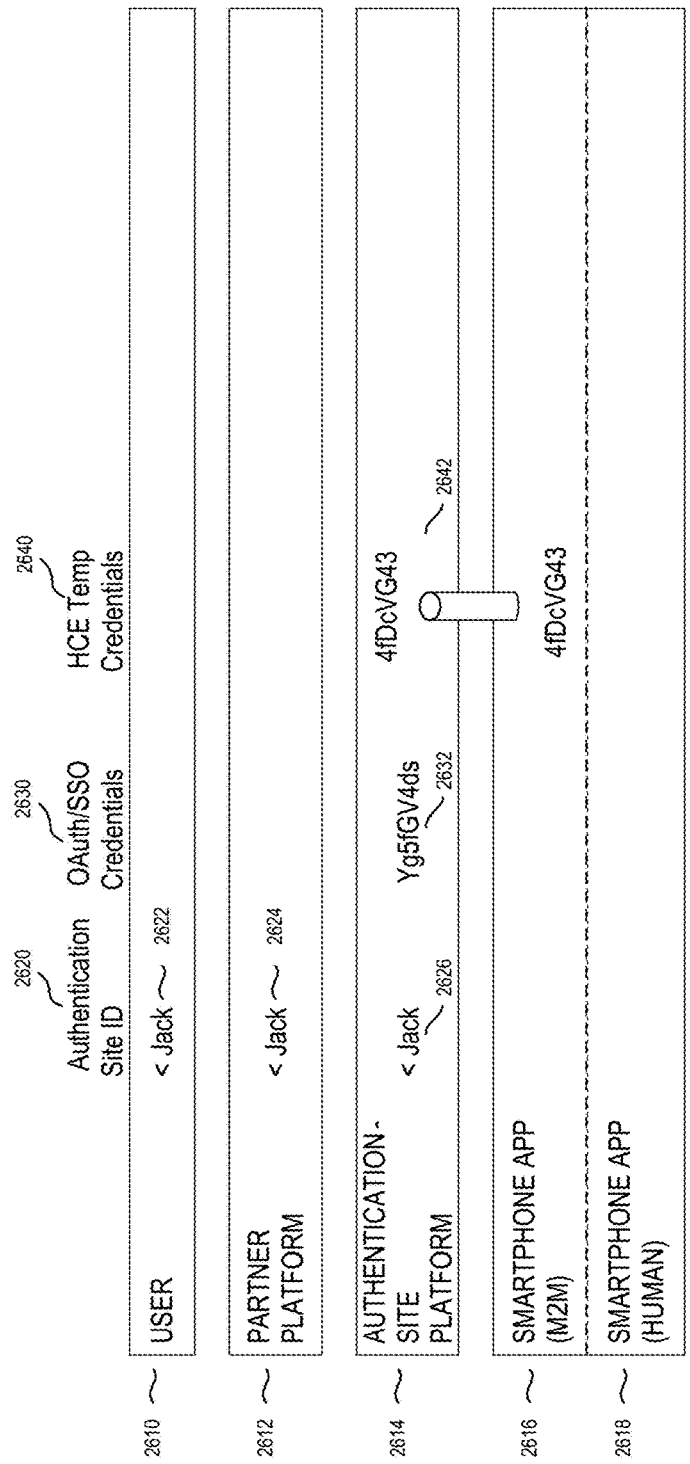
FIG. 29 illustrates one embodiment of an operational scenario by which access to a third-party website can be gained by the mechanism of an authentication platform.

FIG. 29 shows that a secure channel has been established between authentication site platform 2614 and a smartphone app (M2M) 2616 such as on a user device 130. One mechanism for accomplishing this is via HCE or similar technology that ensures security while information is transmitted. This can be made possible inasmuch as steps can be taken so that encryption/decryption keys are not sent over a network. The keys can be stored on a user device 130 and on authentication site platform 2614 server 112; in addition, the keys can change frequently, minimizing unauthorized access.

Figure 30:
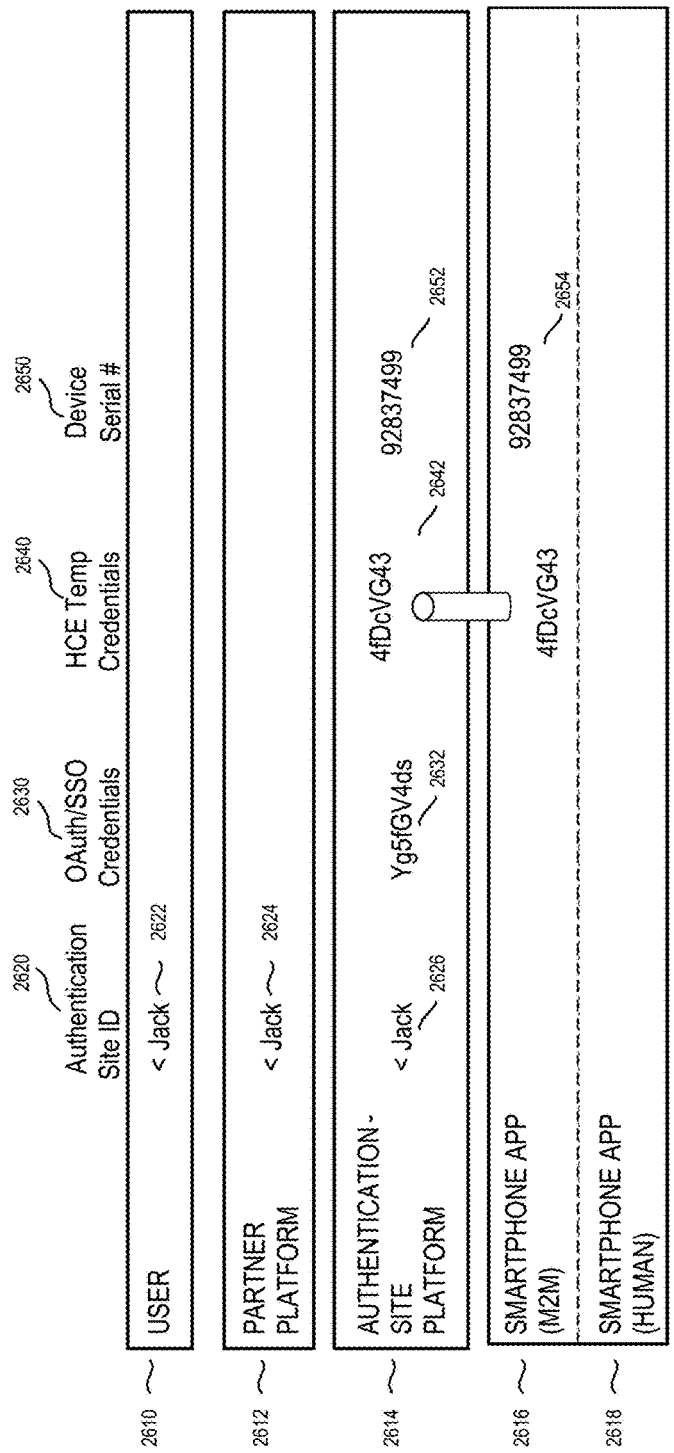
FIG. 30 illustrates one embodiment of an operational scenario by which access to a third-party website can be gained by the mechanism of an authentication platform.

FIG. 30 shows use of a device serial number 2650. Here the secure connection established by HCE credentials 2640 can be used to authenticate the electronic serial number (or other identifier) 2652 of a user device 130, which can be checked against the electronic serial number (or other identifier) registered with authentication platform 2614 during the user's original registration.

Figure 31:
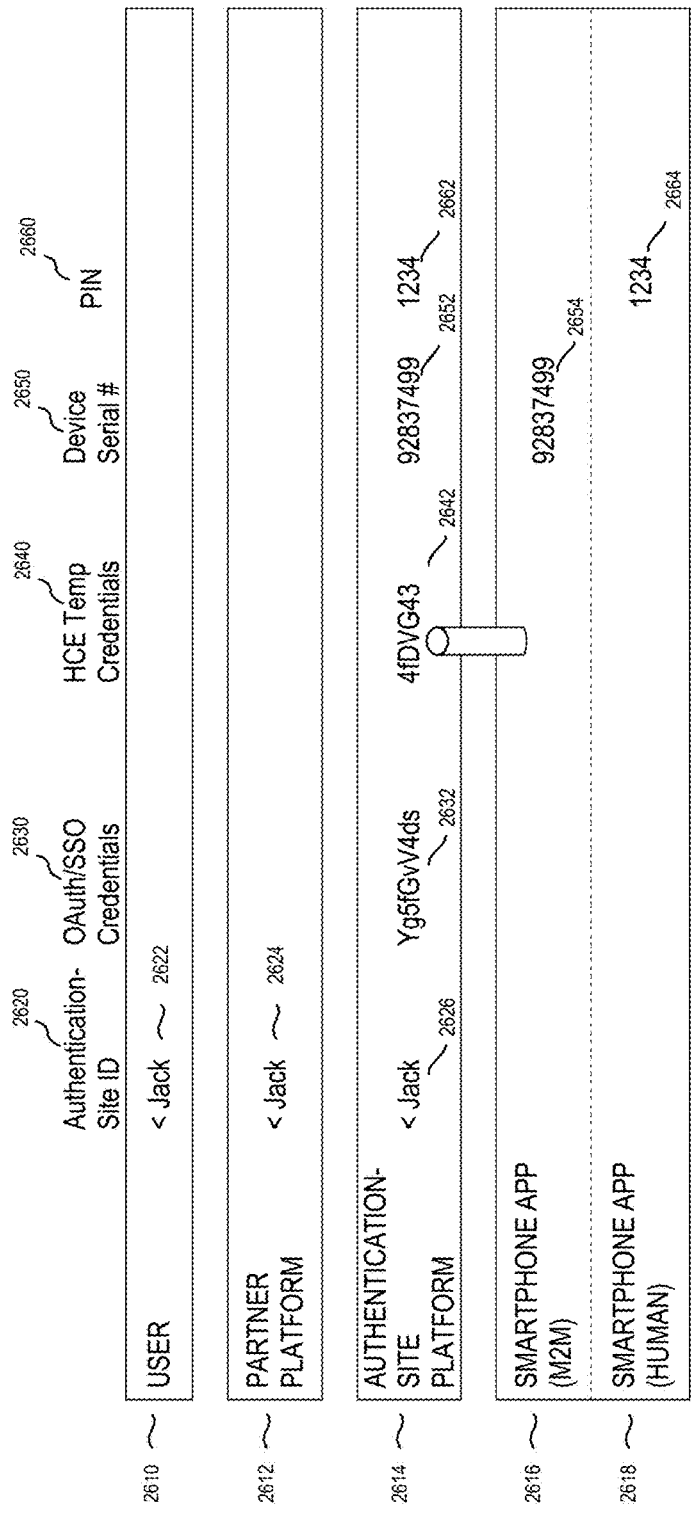
FIG. 31 illustrates one embodiment of an operational scenario by which access to a third-party website can be gained by the mechanism of an authentication platform.

FIG. 31 shows that a PIN 2660 can be used. Here the user has entered a PIN 2664 to authenticate the user as the proper user. Authentication platform 2614 can check the PIN against the stored record 2662 obtained by registration. Again, information passed back and forth can be done via HCE (or similar technology) to ensure the integrity of the data as well as its security during its transit over networks.

Figure 32:
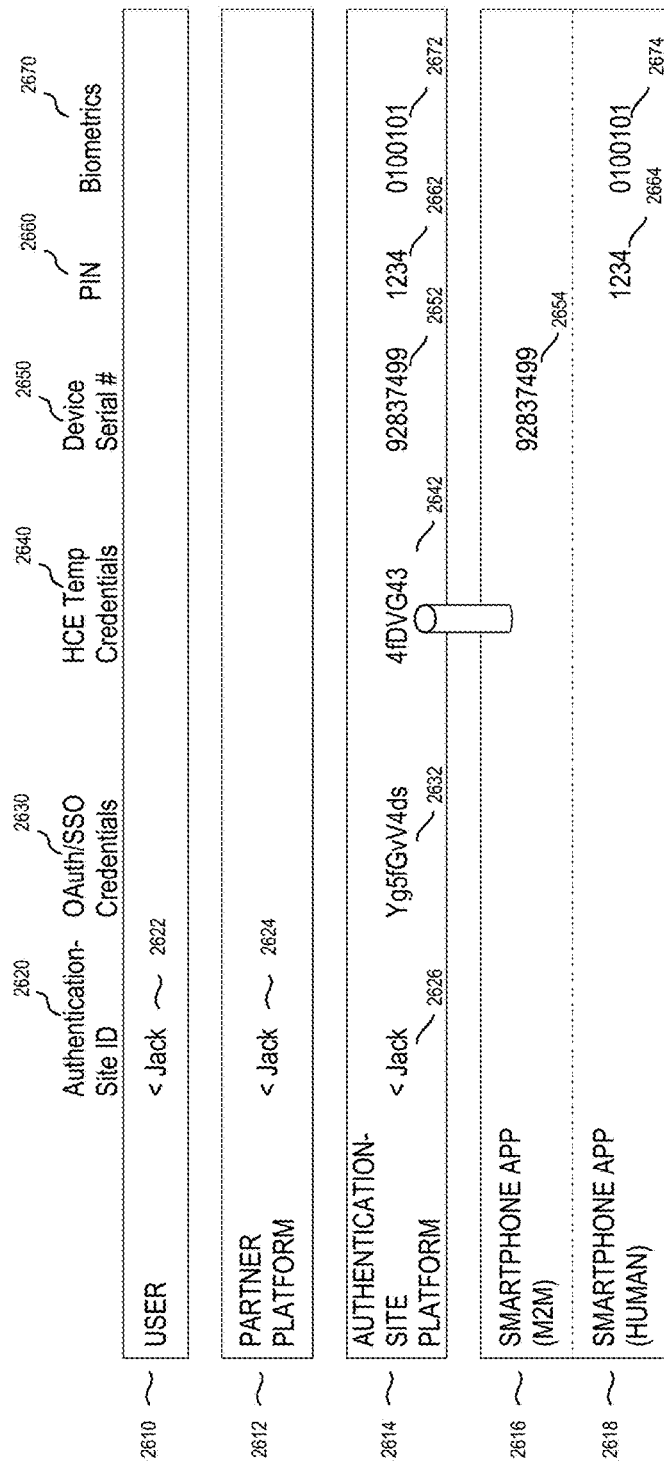
FIG. 32 illustrates one embodiment of an operational scenario by which access to a third-party website can be gained by the mechanism of an authentication platform.

FIG. 32 shows that biometrics 2670 can be used in the authentication process. A biometric attribute associated with the user 2674 can be checked against a biometric attribute sample taken in connection with registration 2672 or at another time.

Figure 33:
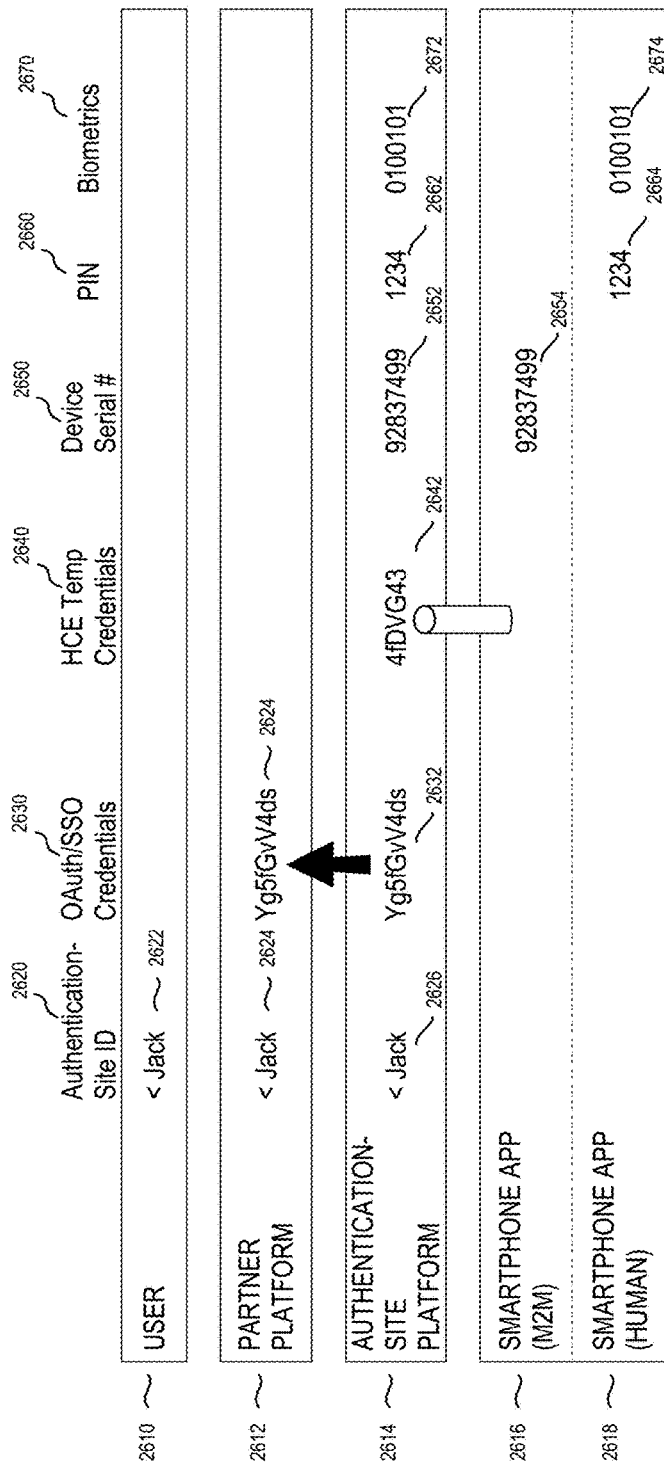
FIG. 33 illustrates one embodiment of an operational scenario by which access to a third-party website can be gained by the mechanism of an authentication platform.

FIG. 33 shows that a credential that authentication platform 2614 and partner platform 2612 associate with this user can now be passed to the partner platform 2612, informing partner platform 2612 that the user has been authenticated, and the exact account(s) the user can be given access to.

Figure 34:
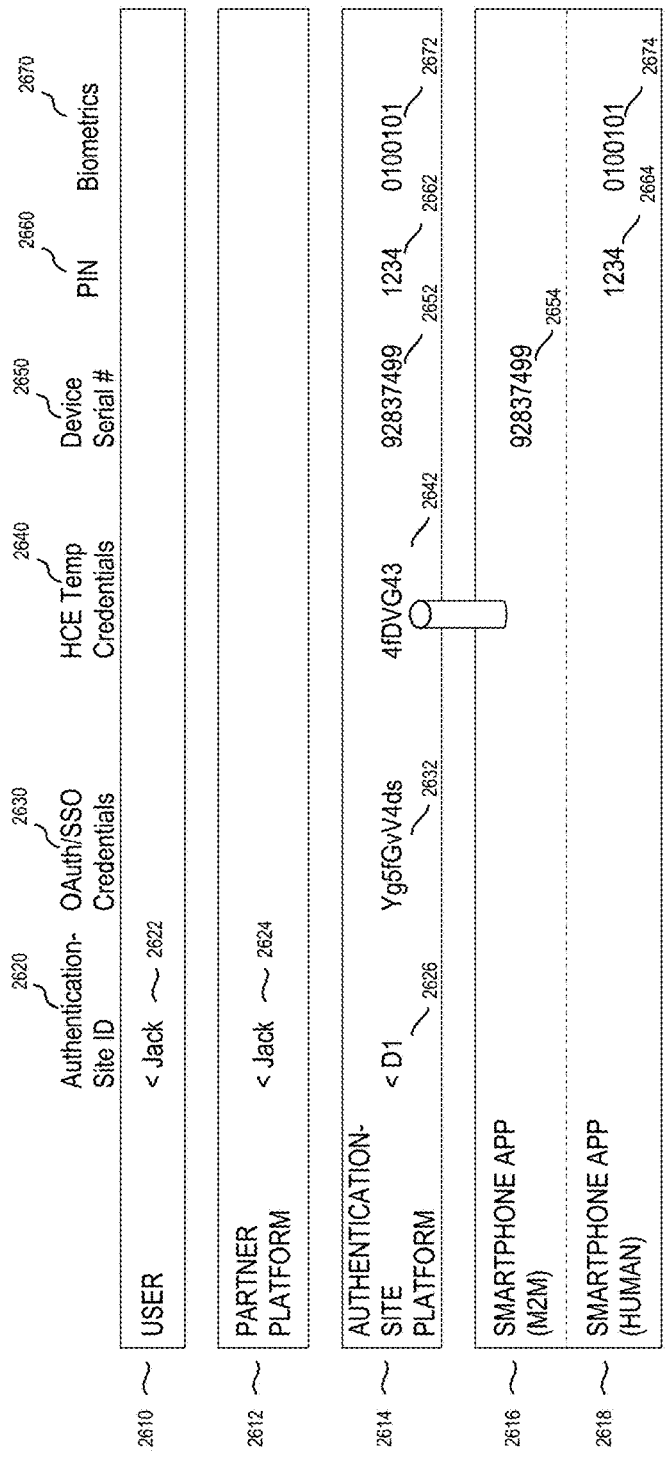
FIG. 34 illustrates one embodiment of an operational scenario by which access to a third-party website can be gained by the mechanism of an authentication platform.

FIG. 34 is an example illustrating that even if the user changes his or her handle 2620, partner platform 2612 is not affected and has no need to change its stored credentials to accommodate such change. A mechanism to accomplish this, for example, is to generate a unique identifier for the user, and inform the third-party partner in advance. When the user with "<jack" 370 wants to use <jack 370 to authenticate to a given website for the first time, authentication platform 110 and the third-party server 150 can have agreed to use "account number 12345" to represent that user. Then, when the <jack 370 user logs in, authentication platform 110 can encrypt and send a message to the third-party server 150 that indicates, 'start a session for user 12345.'

Figure 35:
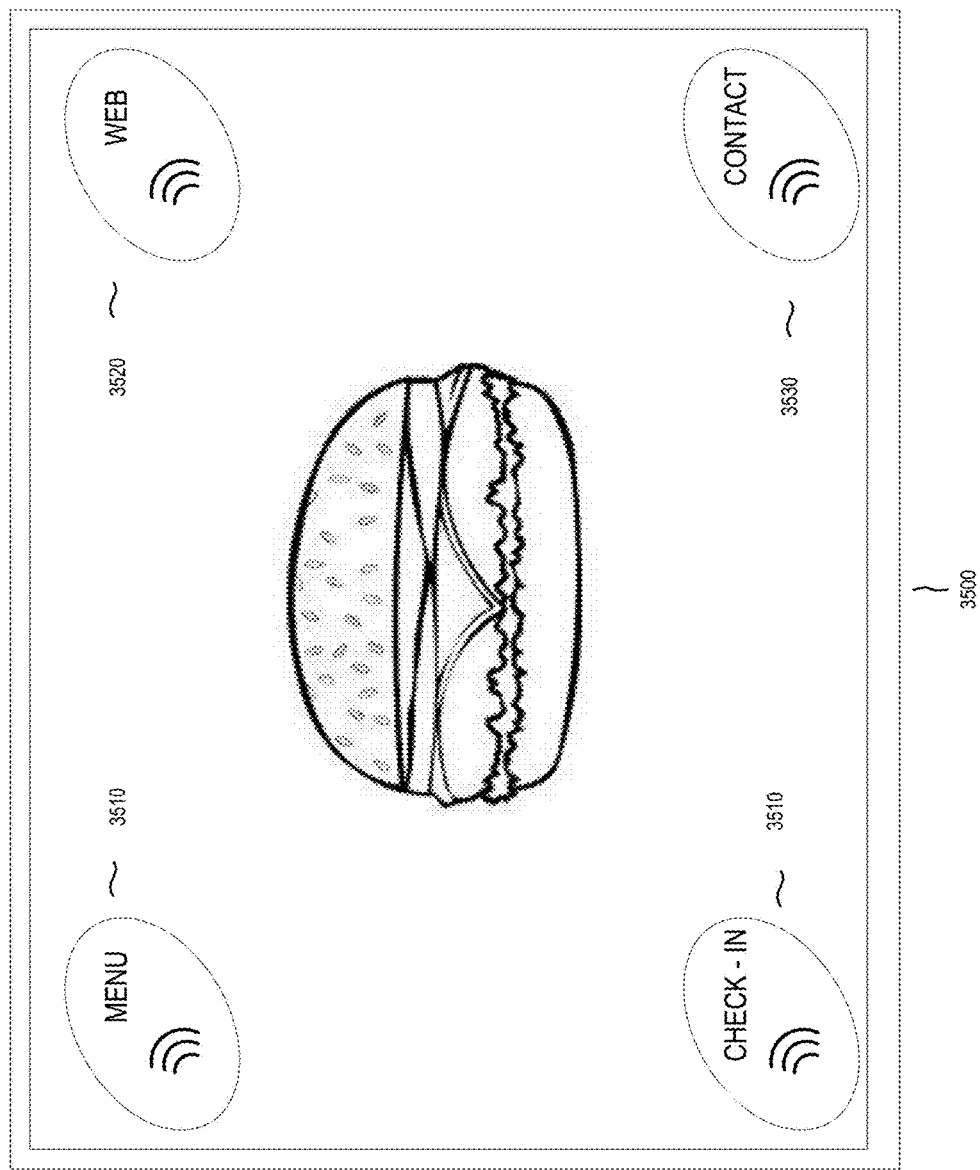
FIG. 35 illustrates one embodiment of use of an authentication platform in relation to a smart poster.

The authentication process carried out by authentication platform 110 can, as described in embodiments herein, begin with a user entering a handle 1414 into a username field 340 of a third-party website 150. There are additional embodiments by which an authentication process can be carried out. An authentication process can begin with interaction between a user device 130 containing or associated with a NFC (Near Field Communication) chip. For example, as illustrated in FIG. 35, a quick-service restaurant can provide a smart poster 3500. Smart poster 3500 can be equipped with several locations 3510, 3520, 3530, 3540 that permit interaction with a user device 130. The user can receive different data depending on the part of the smart poster that the user taps with his or her user device 130. If a user taps a phone that contains an authentication app, then the app can authenticate the user to the quick-service merchant similar to the user's gaining access to the merchant's website. This can confer several benefits. The merchant can send information to a user with a specified zip code (or other user-authorized parameter) requested by the user from the merchant. The information may be valuable to the merchant, who may be willing to pay for it.

The authentication process is comparable to that described herein. By way of non-limiting example, the user can initiate a communication request to smart poster 3500. Smart poster 3500 can transmit a message to authentication platform 110, which can if desired authenticate by means of multiple criteria associated with an authentication module. Once authentication platform recognizes that the identity is appropriately given, a communication can be made back to the merchant associated with smart poster 3500. For example, if an authentication platform 110 user taps option 1 on the poster 3500, and then completes the 'login' on his or her user device 130 by pressing the yes button (or other function), then authentication platform 110 can send a message such as the following to the owner of the smart poster: User #12345 has confirmed that he or she wants to perform option #1 on smart-poster ID#987654321. The owner of the smart poster will know how to respond to the user at its discretion. The user's credentials thus authenticated, a session(s) between user and smart poster 3500 (and/or sponsoring merchant website) can be carried out with enhanced value to both user and merchant.

Figure 36:
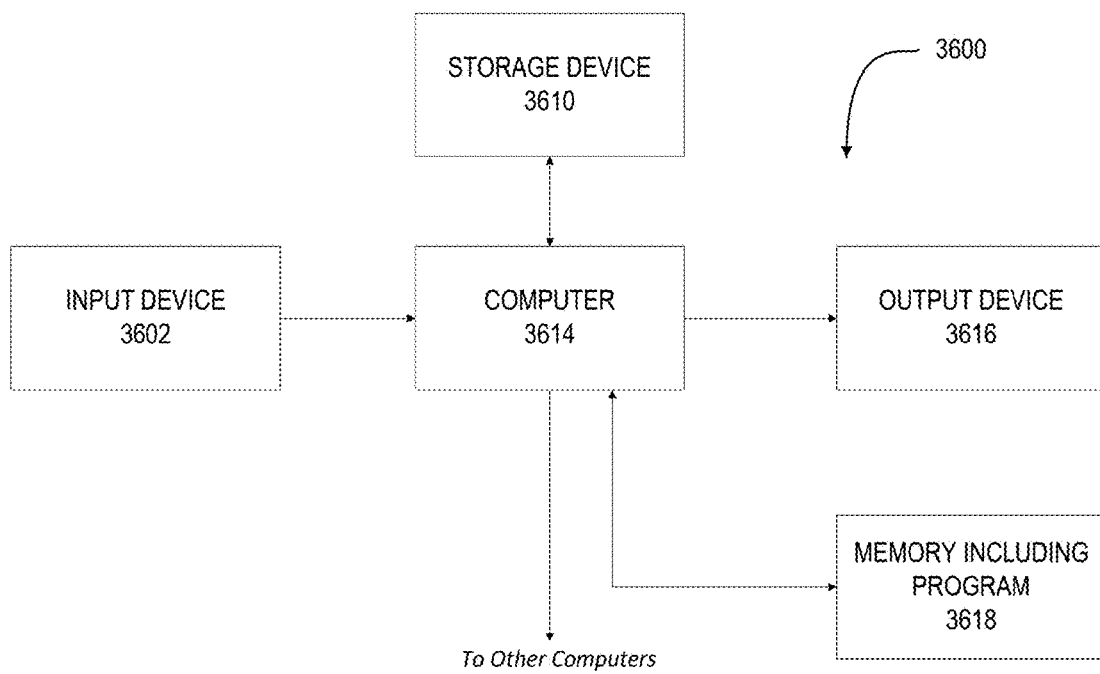
FIG. 36 illustrates one embodiment of a computing environment which can be used in one environment for accessing computer accounts.

FIG. 36 illustrates a computer system 3600 for implementing a method and system for accessing computer accounts according to various embodiments. Computer system 3600 can comprise components and functionalities of authentication platform 110, and/or comprise a subset and/or superset of those of authentication platform 110. Computer 3614 may contain or be operatively associated with a processor(s), and with memory(ies) including storage device 3610 and memory 3618, which also may include software applications. By way of non-limiting example, authentication server 112 can be comprised of, in whole or in part, computer 3614. An input device 3602, such as a keyboard, can be used to enter inputs into, and exercise control of, computer 3614 and components associated therewith. There may be multiple computers operatively associated with computer 3614 and its associated components. There may be an output device 3616 such as a monitor screen, computer-to-computer communication device (e.g., modem), and/or a printer. In an embodiment, non-transitory computer readable media or memory 3618 are provided. Such memory can be comprised of, in whole or in part, user account database 118 and/or activity database 120. The computer-readable media or memory can tangibly embody a program of instructions executable by the computer system to carry out operations as described herein. It will readily be appreciated that each component or subcomponent comprising mechanisms disclosed herein can have or be in operable communication with one or more elements referred to in FIG. 36 including a computing device with processor, associated storage and memories, input devices, output devices, and functionality for networked communications.

By way of non-limiting embodiment, authentication functionality wherein a parent account can control and/or supervise a child account can be facilitated by an app on a mobile device will be disclosed herein, which when furnished with this functionality can be called a "parental control authentication app". The parental control authentication app can comprise all or much of the foregoing functionality, or can comprise a subset thereof. What is significant is that the parental control authentication app can give the user the ability to control aspects of authentication of a subordinate, or junior, user.

Figure 37:
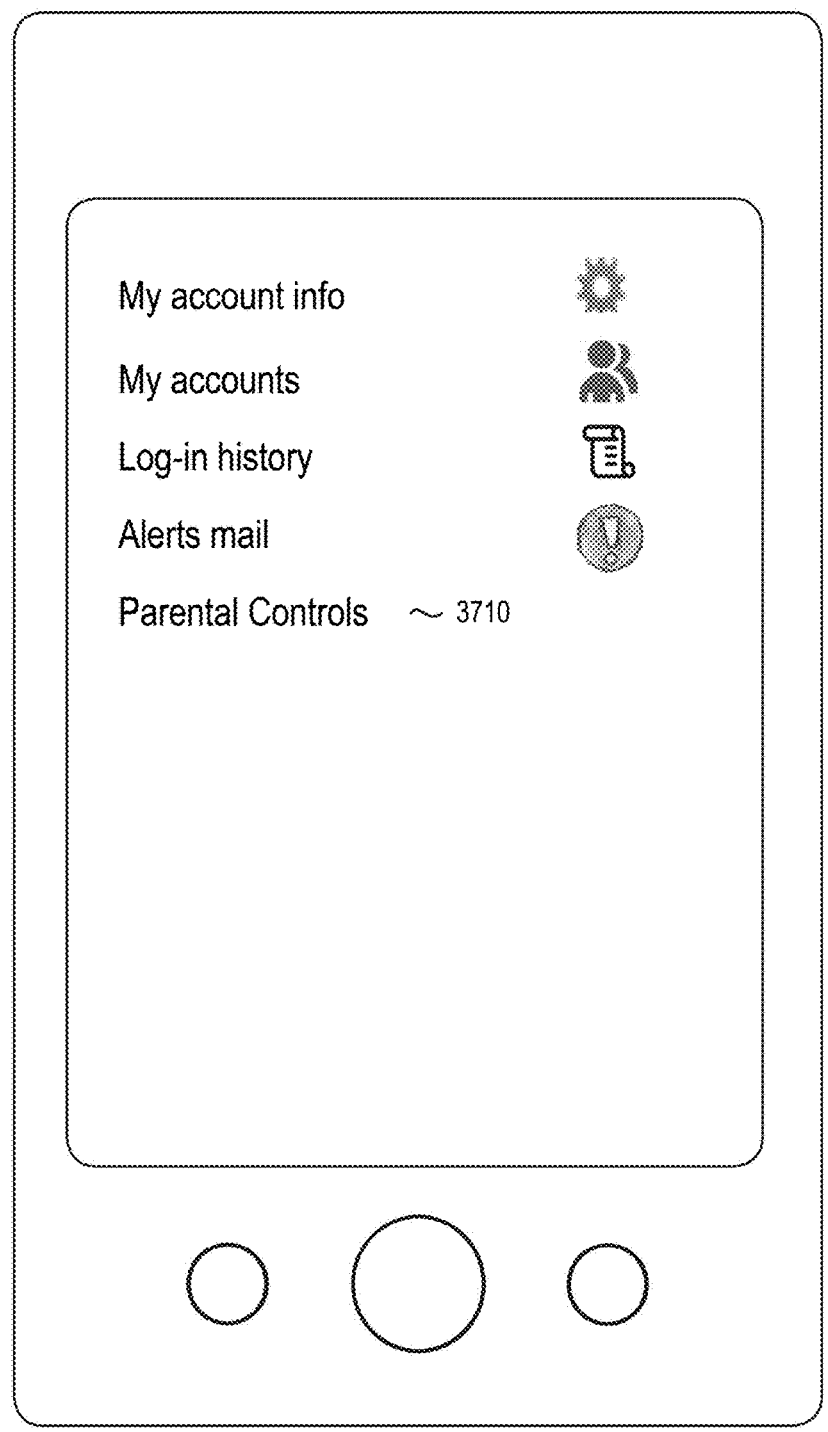
FIG. 37 illustrates one embodiment of a screen display enabling accessibility of parental control functionality.

FIG. 37 show an example screenshot of a user device 130 wherein a user can access a parent account by actuating a "Parental Controls" icon and/or region of the parental authentication app.

Upon so actuating this feature, the user has the ability to perform numerous functions on behalf of the child account including, and by way non-limiting examples the following.

The user associated with the parent account can associate a child account with authentication platform 100 in a manner similar to that provided for establishing the original parent account. In other words, the parent user can register information associated with the child account with authentication platform 100, including registering a special username, i.e., handle 420.

The user associated with the parent account can select the account(s) that are to be accessed by the child's handle 420. For example, the parent can establish access controls to what extent the child can log in to an account in the first place.

The user associated with the parent account can select what, if any, personal data of the child may be shared with another account.

Figure 38:
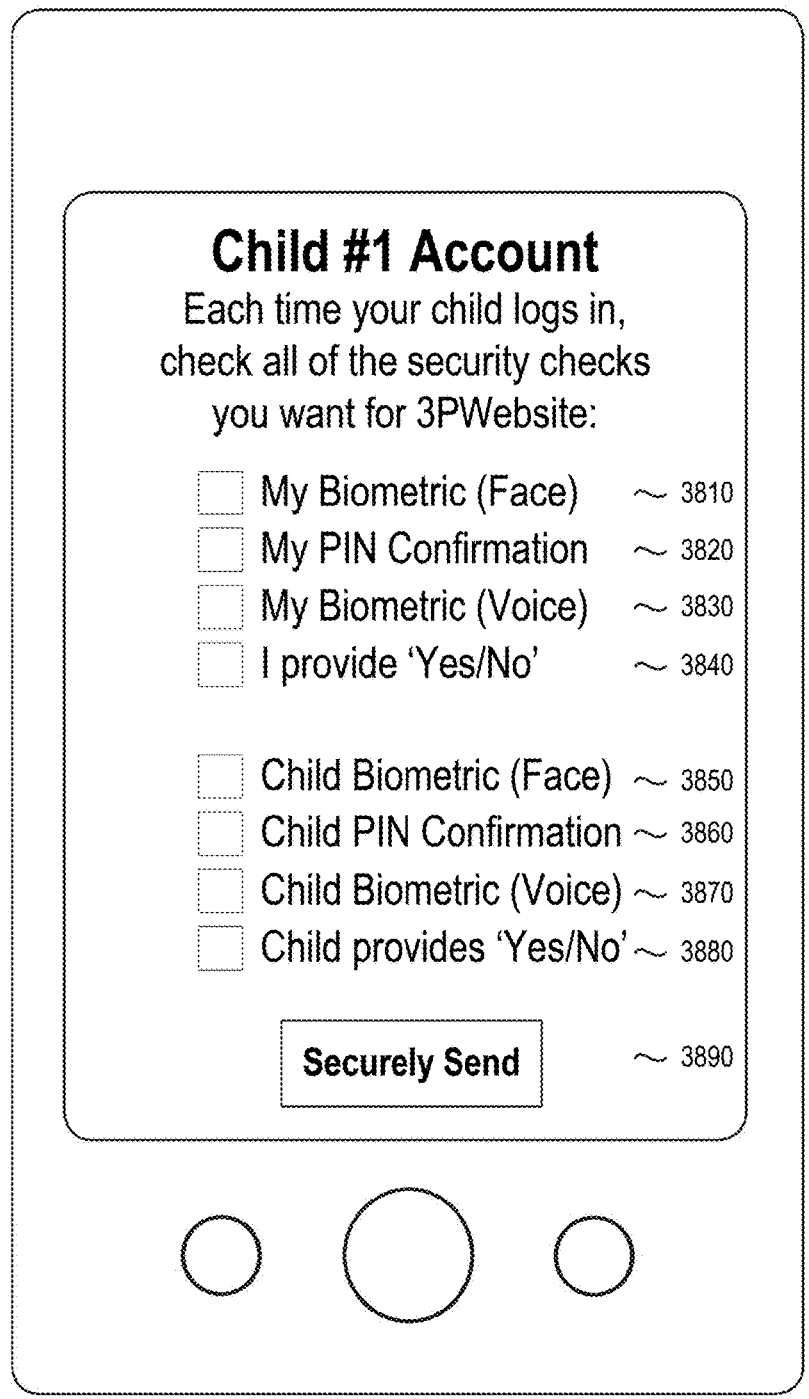
FIG. 38 illustrates one embodiment of a screen display enabling a user to manage authentication parameters in the context of parental control functionality.
Figure 39:
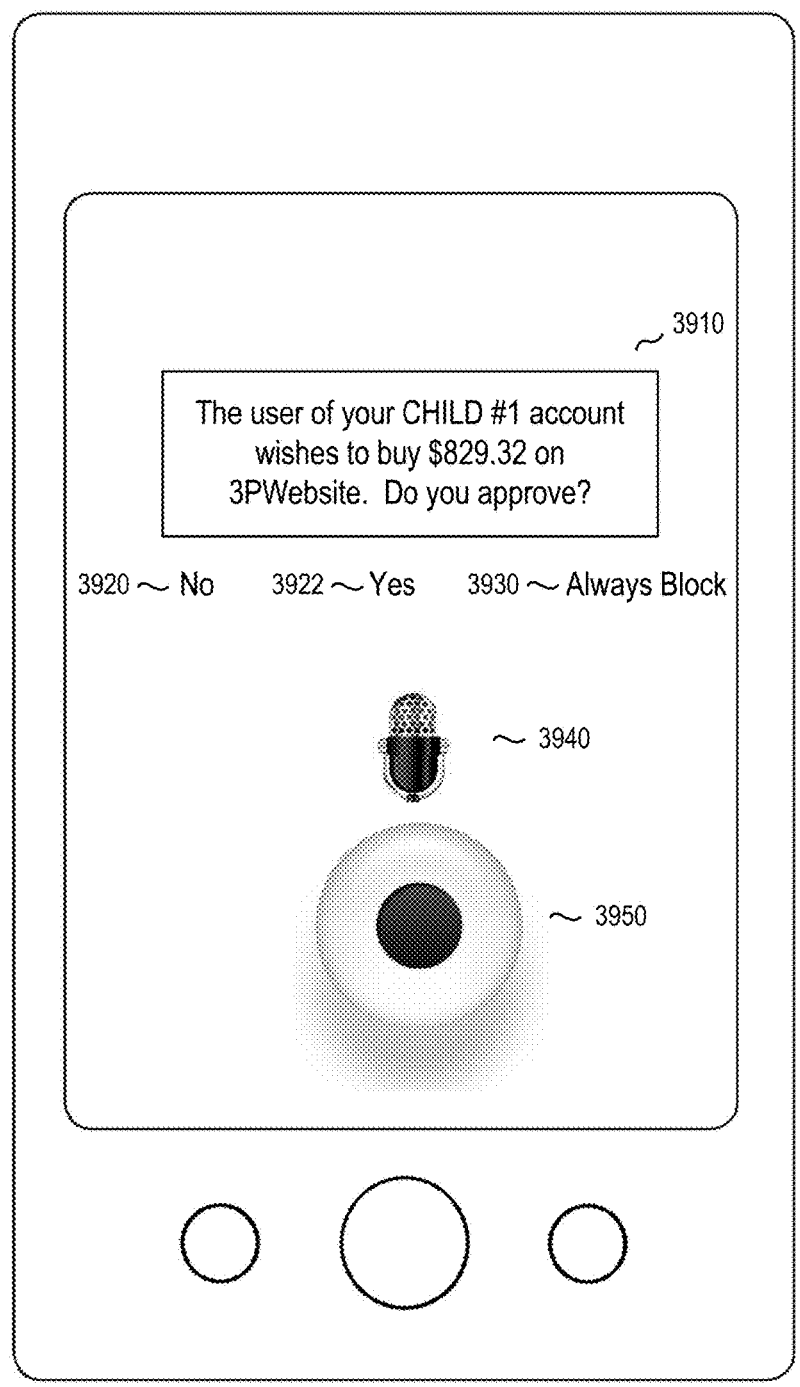
FIG. 39 illustrates one embodiment of a screen display enabling parental control options with respect to an attempted transaction.

The user associated with the parent account can select an authentication method for each login attempt of the child into an authorized account. As seen in FIG. 38, for example, these can include one or more of: a user biometric (face) 3810, user PIN confirmation 3820, user biometric (voice) 3830, user consent 3840, child biometric (face), child PIN confirmation 3860, child biometric (voice) 3870, or child consent 3880. Once selected, these choices can be sent securely 3890 to authentication server 112. As shown above, the user associated with the parent account can select to what extent the child—and/or a device associated with the child account—is able to authenticate access to an authorized account, or if the parent can authorize access.

The user associated with the parent account can approve a request for a third-party website to be given access by the child. For example, the child account holder can request access to a sensitive system, such as money transfer, or purchase approval, but would need the parent or supervisor to allow the transaction to continue by responding appropriately on the mobile device.

The user associated with the parent account can approve attempted purchases by the child account. For example, if the child account attempts to make a purchase, the parent account can be notified thereof, and approval requested 3910. This can be implemented where the child account has already logged in to 3PWebsite 150, and payment needs to be approved based on credentials on file with 3PWebsite 150. The parent may thus approve 3922, actuate a button 3950 via voice or haptic measures to carry out an instruction, disapprove 3920, or instruct that such requests always be blocked 3930.

Figure 40:
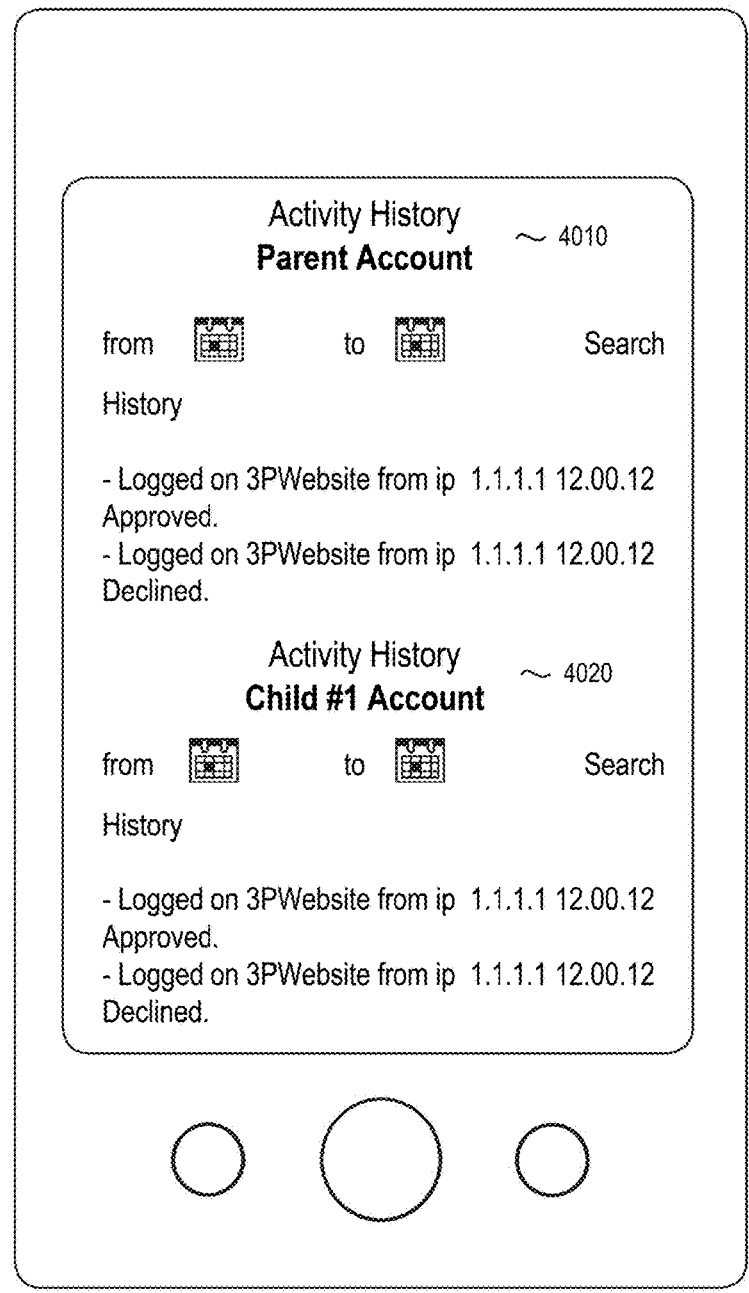
FIG. 40 illustrates one embodiment of a screen display enabling accessibility of activity histories in the context of parental control functionality.

The user associated with the parent account can monitor activity associated with the parent account, as well as activity in one or more child accounts. As seen in FIG. 40, this can be accomplished via a history screen in the app. The activity history of the parent account 4010 can be displayed, as well as that of the child account 4020. In FIG. 40 is seen one child account, where a user with access to the parent account can see the activity log of the parent and child accounts.

While various details have been set forth in the foregoing description, it will be appreciated that the various aspects of the computer accounting accessing mechanisms herein may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art.

Unless specifically stated otherwise as apparent from the foregoing discussion, it is appreciated that, throughout the foregoing description, discussions using terms such as "processing" or "computing" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

Some or all of the embodiments described herein may generally comprise technologies for accessing computer accounts, or otherwise according to technologies described herein. In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.).

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

What is claimed is:

1. An authentication server for managing access of a child-account device to a third-party server, the authentication server comprising at least one processor and operatively associated memory, the authentication server configured to: receive, from a parent-account device, a notification that the authentication server may proceed to evaluate access credentials associated with the child-account device; receive, from the third-party server, access credentials associated with the child-account device, wherein the access credentials are based on a string containing a predetermined identifier sent to the third-party server by the child-account device; and determine that the access credentials received from the third-party server match child-account access credentials received by the authentication server, wherein the position of the predetermined identifier in the string is a prefix position, and the predetermined identifier in the string is the first character in a username;
wherein the authentication server is further configured to transmit a message to the parent-account device indicating that the third-party server has contacted the authentication server in connection with attempting to authenticate the child-account device or the child-account user;
wherein the authentication server is further configured to receive a message from the child-account device with conditions by which the child-account user consents to, or declines to consent to, establishing a trusted relationship between the user device and the thud-party server.

2. The authentication server of claim 1, wherein the authentication server is further configured to determine that the child-account device and the third-party server can be accorded a secure relationship level.

3. The authentication server of claim 2, wherein the authentication server is further configured to determine that the child-account device is authorized for authentication to an account associated with the third-party server.

4. The authentication server of claim 1, wherein the access credentials sent by the third-party server to the authentication server are the same as the string containing a predetermined identifier.

5. The authentication server of claim 1, wherein the authentication server is further configured to contact the child-account device to obtain access information.

6. The authentication server of claim 1, wherein the authentication server is further configured to carry out an authentication determination related to the identity of the child-account user.

7. The authentication server of claim 6, wherein the authentication determination includes a determination related to the relationship of the child-account user to a regulated identity.

8. The authentication server of claim 6, wherein the authentication determination includes a determination related to the relationship of the parent-account user to a regulated identity.

9. The authentication server of claim 6, wherein the authentication determination relates to one or more of: whether the input string received from the third-party server resolves to a valid user handle, a token on the child-account device is validly used to authenticate to the authentication server; a username entered on the child-account device; a PIN entered by the child-account device user; a biometric measure; a verification that the parent-account user has established an account with a regulated entity; a location of the child-account device; an ESN; or a UUID.

10. The authentication server of claim 6, wherein the authentication server is further configured to transmit the results of the authentication determination to the third-party server.

11. The authentication server of claim 1, wherein the conditions comprise one or more of a biometric measure, a PIN, or one of an affirmative response or a negative response.

12. A third-party server associated with a user account, the third-party server configured to: receive, from a parent-account device, a notification that the third-party server may proceed to evaluate access credentials associated with the child-account device; receive child-account access credentials in connection with an attempt by a child-account device to access a child account associated with the third-party server; and determine, in response to determining that the child-account credentials contain a string with a predetermined identifier, that a message he transmitted to an authentication server, wherein the contents of the message contain a string similar to the string received from the child-account, wherein the position of the predetermined identifier in the string is in a prefix position, and the predetermined identifier in the string is the first character in a username;

wherein the authentication server is further configured to transmit a message to the parent-account device indicating that the third-party server has contacted the authentication server in connection with attempting to authenticate the child-account device or the child-account user;

wherein the authentication server is further configured to receive a message from the child-account device with conditions by which the child-account user consents to, or declines to consent to, establishing a trusted relationship between the user device and the thud-party server.

13. The third-party server of claim 12, wherein the third-party server is further configured to receive, in association with the child-account device's attempt to access the third-party server, security checks established by, or preapproved by, the parent account.

14. The third-party server of claim 13, wherein the security checks comprise one or more of a biometric measure, a PIN, an email from the authentication platform to the child account device or parent account device, a location of the child account device, a relationship of the child-account user or parent-account user with a regulated entity, and an identifying feature that uniquely identifies the child-account device.

15. A platform for providing an authentication sequence to manage access of a child-account device to a third-party server, the platform comprising: an identifier-detection module enabling a third-party server to check whether a username received from the child-account device contains a username with a predetermined identifier; and a forwarding module enabling the third-party server, in response to determining that the username contains the predetermined identifier, to transmit a message to an authentication, server that includes, the username containing the predetermined identifier, wherein the position of the predetermined identifier in the username is in a prefix position, and the predetermined identifier in the string is the first character in a username;

wherein the authentication server is further configured to transmit a message to the parent-account device indicating that the third-party server has contacted the authentication server in connection with attempting to authenticate the child-account device or the child-account user;

wherein the authentication server is further configured to receive a message from the child-account device with conditions by which the child-account user consents to, or declines to consent to, establishing a trusted relationship between the user device and the thud-party server.

16. A non-transitory computer-readable medium storing a program causing a processor to execute instructions causing an authentication sequence, the authentication sequence comprising: receiving, from a parent-account device, a notification that a third-party server may proceed to evaluate access credentials associated with a child-account device; transmitting to the third-party server, from a child-account device, a username associated with a predetermined identifier; receiving, from an authentication server to which the third-party server sent a message that include a message comprising the username with the predetermined identifier, a request to approve access between the child-account device and the third-party server, wherein the position of the predetermined identifier in the username is in a prefix position, and the predetermined identifier in the string is the first character in a username;

wherein the authentication server is further configured to transmit a message to the parent-account device indicating that the third-party server has contacted the authentication server in connection with attempting to authenticate the child-account device or the child-account user;

wherein the authentication server is further configured to receive a message from the child-account device with conditions by which the child-account user consents to, or declines to consent to, establishing a trusted relationship between the user device and the thud-party server.

* * * * *